(12) United States Patent
Kanzaki

(10) Patent No.: US 12,182,644 B2
(45) Date of Patent: Dec. 31, 2024

(54) PRINTING APPARATUS, METHOD FOR CONTROLLING PRINTING APPARATUS, AND COMPUTER-READABLE STORAGE MEDIUM

(71) Applicant: Brother Kogyo Kabushiki Kaisha, Nagoya (JP)

(72) Inventor: Takashi Kanzaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 83 days.

(21) Appl. No.: 18/058,885

(22) Filed: Nov. 28, 2022

(65) Prior Publication Data

US 2023/0244893 A1  Aug. 3, 2023

(30) Foreign Application Priority Data

Jan. 31, 2022  (JP) ................... 2022-013434

(51) Int. Cl.
 G06K 15/02 (2006.01)
 B41J 2/045 (2006.01)
 B41J 2/175 (2006.01)
 B41J 2/21 (2006.01)
(52) U.S. Cl.
 CPC ........ G06K 15/027 (2013.01); B41J 2/04501 (2013.01); B41J 2/175 (2013.01); B41J 2/2146 (2013.01)

(58) Field of Classification Search
 CPC . G06K 15/027; G06K 15/129; B41J 2/04501; B41J 2/175; B41J 2/2146; B41J 2/2132; B41J 19/147
 See application file for complete search history.

(56) References Cited

U.S. PATENT DOCUMENTS

2008/0112025 A1   5/2008  Kishimoto
2021/0354475 A1*  11/2021 Tayuki .................. B41J 2/2132

FOREIGN PATENT DOCUMENTS

JP  2008-123291 A  5/2008
JP  2016-163129 A  9/2016

* cited by examiner

Primary Examiner — Lisa Solomon
(74) Attorney, Agent, or Firm — Scully, Scott, Murphy & Presser, P.C.

(57) ABSTRACT

A printing apparatus, having a first head including first nozzles and first driving elements, a second head including second nozzles and second driving elements, first flow paths, a second flow path, and a controller, is provided. The controller is configured to acquire a first printing color gamut and, after loading the second flow path with the ink in the custom color, operate the first and second driving elements to print patches for first imaging color values. The first printing color gamut is a gamut including a custom color within a printing color gamut in a predetermined color space. The printing color gamut is a gamut including color values of colors printable in the inks in basic colors and the custom color. The first imaging color values are color values falling within the first printing color gamut among color values in image data of the image to be printed.

15 Claims, 21 Drawing Sheets

PRINTING APPARATUS, METHOD FOR CONTROLLING PRINTING APPARATUS, AND COMPUTER-READABLE STORAGE MEDIUM

REFERENCE TO RELATED APPLICATIONS

This application claims priority from Japanese Patent Application No. 2022-013434 filed on Jan. 31, 2022. The entire content of the priority application is incorporated herein by reference.

BACKGROUND ART

The present disclosure is related to a printing apparatus, a method for controlling the printing apparatus, and a computer-readable storage medium therefor.

A color processing apparatus is known. The color processing apparatus may acquire an evaluation value indicating a gap between an imaging color value in image data composing an image and a predetermined gamut provided to an output apparatus that may output the image. The color processing apparatus may, when the acquired evaluation value is greater than a predetermined threshold value, convert the imaging color value to an outputting color value so that the imaging color value may stay within the gamut of the output apparatus. Meanwhile, the color processing apparatus may, when the acquired evaluation value is smaller than or equal to the predetermined threshold value, receive the imaging color value as the outputting color value without converting. The color processing apparatus may create a color profile, in which each of the imaging color values and each of the outputting color values are linked, and execute color-converting processes based on the created color profile.

DESCRIPTION

Thus, the known color processing apparatus may evaluate the gaps between the imaging color values and the predetermined gamut provided to the output apparatus and convert the colors based on the evaluation values. However, there may be cases that the output apparatus may not reproduce the input colors within the given predetermined gamut. Therefore, to those colors, the output apparatus may apply custom colors different from the given gamut. In such occasions, there may be demands for techniques to select a suitable custom color that may improve reproducibility of images.

The present disclosure is advantageous in that a printing apparatus, a method for controlling the printing apparatus, and a computer-readable storage medium for controlling the printing apparatus, by which reproducibility of images may be improved with use of a custom color, are provided.

CONFIGURATION OF PRINTING APPARATUS

Figure 1:
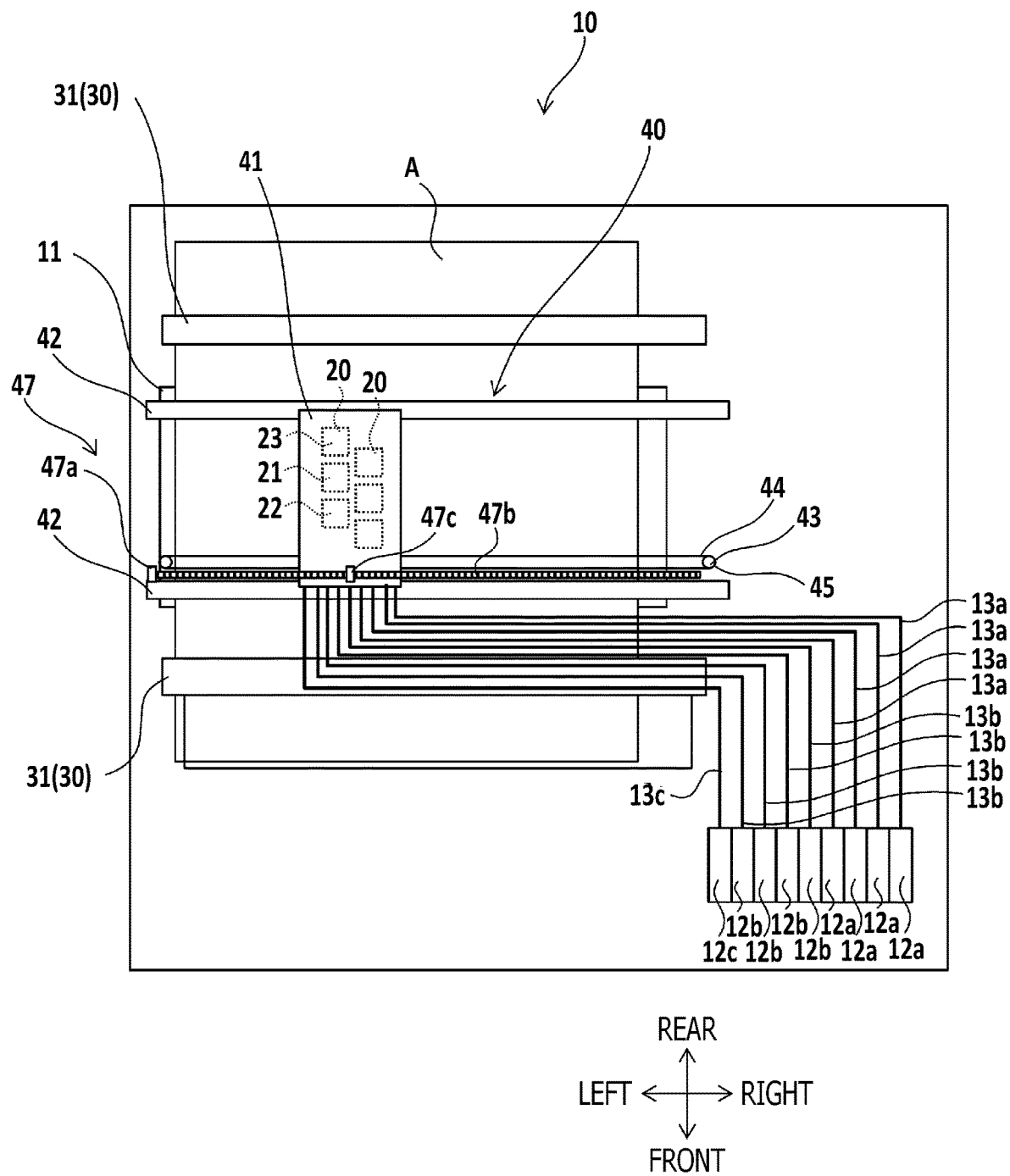
FIG. 1 is a schematic top plan view of a printing apparatus.

A printing apparatus 10 according to an embodiment of the present disclosure is, as shown in FIG. 1, a printer that may operate heads 20 to discharge inks through nozzles 24 (see FIG. 2) at a printing medium A to print an image in the inks on the printing medium A. In other words, the printing apparatus 10 may be an inkjet printer. However, the printing apparatus 10 may not necessarily be limited to an inkjet printer. The printing medium A may be, for example, a sheet of paper or fabric.

The printing apparatus 10 is a printer in a serial-head style having a plurality of heads 20, a platen 11, a plurality of tanks 12, a conveyer 30 and a movable device 40. In the description below, a first direction, in which the printing medium A may be conveyed by the conveyer 30 on the platen 11, will be called "front-rear direction." A second direction intersecting, for example, orthogonally, with the first direction will be called "widthwise direction." A direction intersecting, for example, orthogonally, with the first direction and the second direction, will be called "vertical direction." However, orientation of the printing apparatus 1 may not necessarily be limited to the orientation mentioned herein. Optionally, the printing apparatus 10 may be a printer in a line-head style. When the printing apparatus 10 is the line-head styled printer, the printing apparatus 10 may not have the movable device 40, but the heads 20 may stay in one place and have a length greater than a printable area in the printing medium A.

The plurality of heads 20 include a first head 21, a second head 22, and a third head 23. The heads 20 are in an arrangement such that downward surfaces thereof face the platen 11. The platen 11 has a substantially flat upper surface and defines a distance between the printing medium A placed on the upper surface and the downward surfaces of heads 20 in the vertical direction. The tanks 12 are containers to store the inks. A number of the tanks 12 is equal to or larger than a number of types of the ink. For example, the tanks 12 may include four (4) first tanks 12a, one or more second tanks 12b, and one or more third tanks 12c. The first tanks 12a may store inks in four basic colors, the second tank(s) 12b may store ink(s) in custom color(s), the third tank(s) 12c may store ink(s) of foundation color(s).

The inks for the basic colors may be, for example, an ink in cyan, an ink in yellow, an ink in magenta, and an ink in black. The ink(s) in the custom color(s) may include, for example, an ink in red, an ink in green, and an ink in blue, which are colors different from the basic colors. The ink(s) of the foundation color(s) may include, for example, an ink in white.

Each of the first tanks 12a stores the ink in one of the basic colors and is continuous to the first heads 21 through first flow paths 13a. The inks in the basic colors may be supplied from the first tanks 12a through the first flow paths 13a to the first heads 21. Each of the second tanks 12b stores the ink in one of the custom colors and is continuous to the second heads 22 through second flow paths 13b. Once the second tank 12b is loaded with the ink in the custom color, the ink may flow from the second tank 12b through the second flow path 13b and may be supplied to the second head 22. Before the second tank 12b is loaded with the ink in the custom color, the second tank 12b may be filled with preservative solution or liquid different from the ink in the custom color. Each of the third tanks 12c is continuous to the third heads 23 through third flow paths 13c. The ink in the foundation color may be supplied from the third tanks 12c through the third flow paths 13c to the third head 23. The first flow paths 13a, the second flow paths 13b, and the third flow path 13c may be made of, for example, rubber tubes or plastic tubes, and may be preferably flexible against bending forces.

Figure 3:
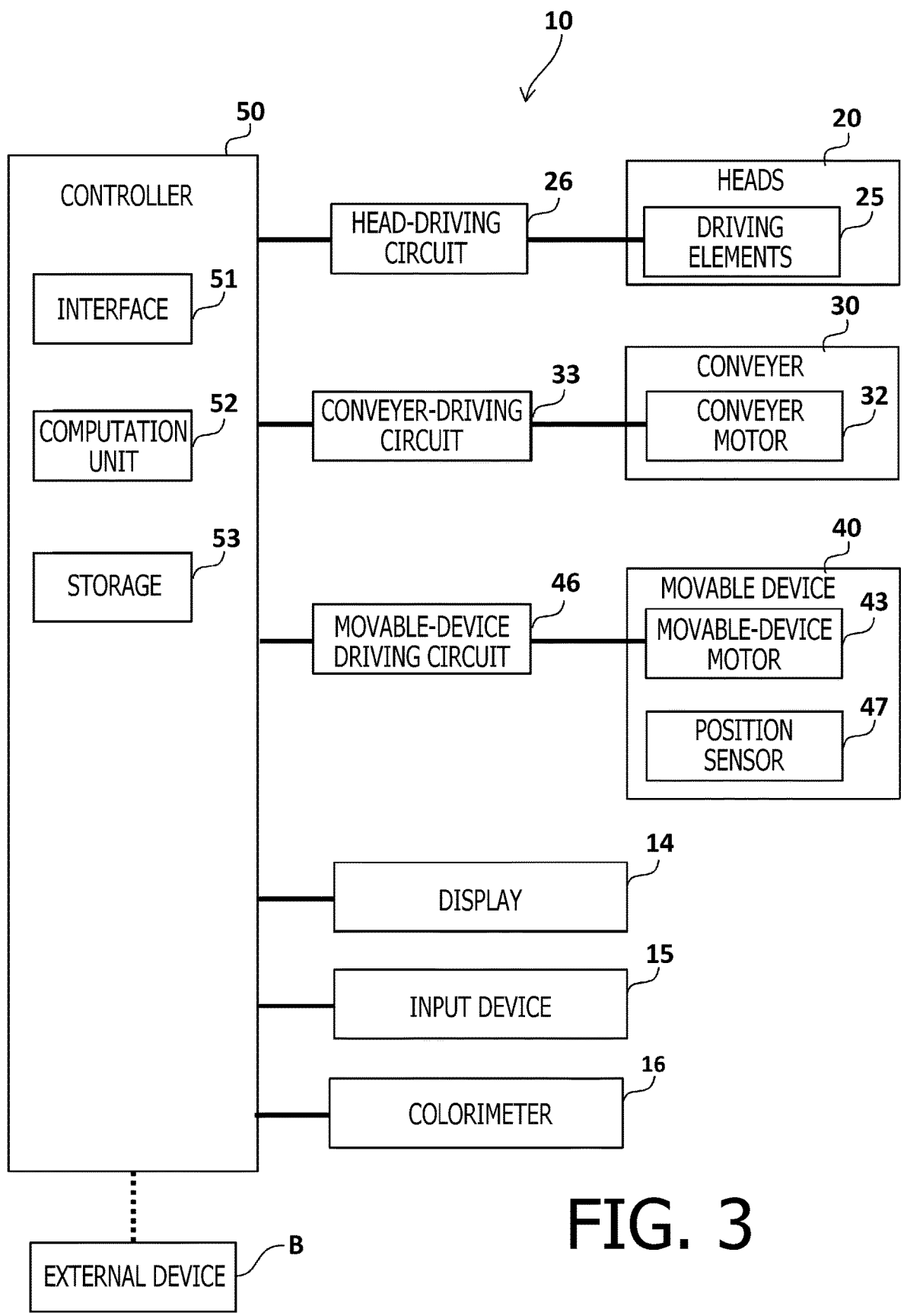
FIG. 3 is a block diagram to illustrate components in the printing apparatus.

The conveyer 30 may include, for example, two (2) pairs of conveyer rollers 31 and a conveyer motor 32 (see FIG. 3). The two pairs of conveyer rollers 31 are arranged on one side and the other side of the platen 11 in the front-rear direction. Each conveyer roller 31 has a shaft extending in the widthwise direction. The conveyer rollers 31 in each pair align in the vertical direction in an arrangement such that the printing medium A may be nipped there-between. One of the paired conveyer rollers 31 is coupled to the conveyer motor 32. The conveyer rollers 31 may be rotated on the shaft thereof by a driving force from the conveyer motor 32 and convey the printing medium A in the front-rear direction over the platen 11.

The movable device 40 includes a carriage 41, two (2) guide rails 42, a movable-device motor 43, and an endless belt 44. The guide rails 42 extends in the widthwise direction at positions above the platen 11. The guide rails 42 are arranged on one side and the other side of the heads 20 in the front-rear direction. The carriage 41 has the heads 20 mounted thereon and is supported by the guide rails 42 movably in the widthwise direction along the guide rails 42.

The endless belt 44 longitudinally extends in the widthwise direction and is attached to the carriage 41. The endless belt 44 is coupled to the movable-device motor 43 through a pulley 45. As the movable-device motor 43 drives, the endless belt 44 may circulate, and the carriage 41 may reciprocate in the widthwise direction along the guide rails 42. Thereby, the carriage 41 may carry the heads 20 in the widthwise direction and move along with a plurality of nozzles 24, which are described further below.

<Heads>

Figure 2:
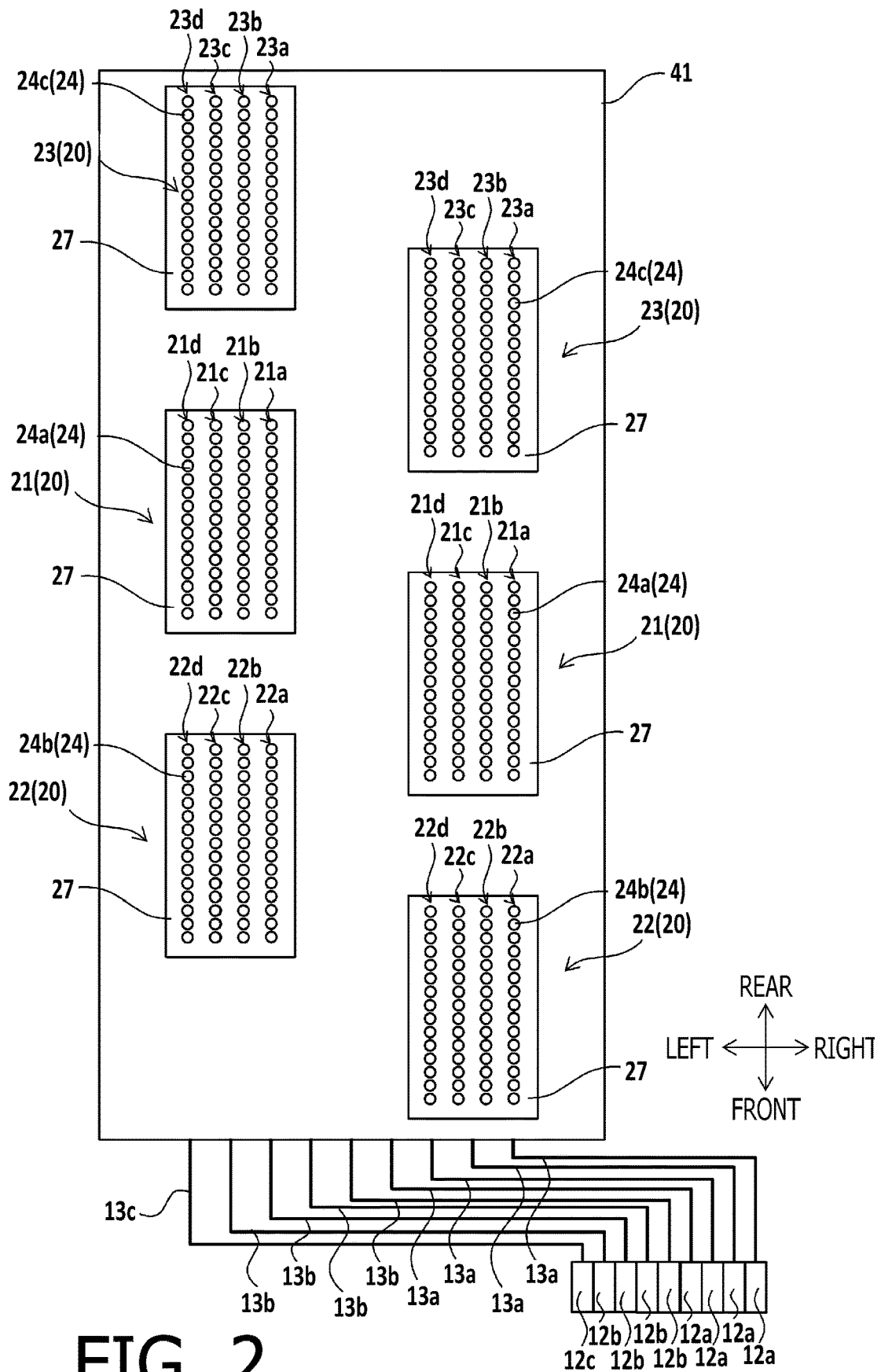
FIG. 2 is a bottom plan view of heads in the printing apparatus.

On the carriage 41, as shown in FIG. 2, the plurality of heads 20 are mounted. The plurality of heads 20 may include, for example, two (2) first heads 21, two (2) second heads 22, and two (2) third heads. The first heads 21 include the first head 21 on the right and the first head 21 on the left. The second heads 22 include the second head 22 on the right and the second head 22 on the left. The third heads 23 include the third head 23 on the right and the third head 23 on the left.

For example, the second head 22 on the right, the first head 21 on the right, and the third head 23 on the right are spaced from one another and align in line along the front-rear direction in this given order from front to rear. The second head 22 on the left, the first head 21 on the left, and the third head 23 on the left are spaced from one another and align in line along the front-rear direction in this given order from front to rear. In the front-rear direction, the first head 21 on the right is located frontward with respect to the first head 21 on the left, the second head 22 on the right is located frontward with respect to the second head 22 on the left, and the third head 23 on the right is located frontward with respect to the third head 23 on the left. In other words, the heads 20 are in an alternately staggered arrangement.

Each of the heads 20 has a flow-path forming member and the plurality of nozzles 24. The flow-path forming member consists of a plurality of layered plates including a nozzle plate 27. The nozzle plate 27 is a flat piece of plate, and a lower surface thereof forms the lower surface of the head 20. The nozzles 24 are open downward through the lower surface of the nozzle plate 27 being the lower surface of the head 20. The plurality of nozzles 24 include first nozzles 24a in the first heads 21, second nozzles 24b in the second heads 22, and third nozzles 24c in the third heads 23. The nozzles 24 in each head 20 align in the front-rear direction to form a plurality of nozzle lines. The nozzle lines are spaced from one another in the widthwise direction and arranged in parallel with one another along the front-rear direction. Each of the first heads 21 has first nozzle lines 21a-21d, each of the second heads 22 has second nozzle lines 22a-22d, each of the third heads 23 has third nozzle lines 23a-23d.

The first nozzles 24a in the first nozzle lines 21a are continuous with the first tank 12a containing the ink in cyan through the first flow path 13a and may discharge the ink in cyan. The first nozzles 24a in the first nozzle lines 21b are continuous with the first tank 12a containing the ink in magenta through the first flow path 13a and may discharge the ink in magenta. The first nozzles 24a in the first nozzle lines 21c are continuous with the first tank 12a containing the ink in yellow through the first flow path 13a and may discharge the ink in yellow. The first nozzles 24a in the first nozzle lines 21d are continuous with the first tank 12a containing the ink in black through the first flow path 13a and may discharge the ink in black. The third nozzles 24c in the third nozzle lines 23a-23d are continuous with the third tank 12c containing the ink in white through the third flow path 13c and may discharge the ink in white.

The second nozzles 24b in the second nozzle lines 22a-22d are continuous with the second tank 12b containing the ink in the custom colors through the second flow paths 13b. When the second tanks 12b are loaded with the inks in the custom colors, the inks in the custom colors may be supplied from the second tanks 12b to the second nozzles 24b through the second flow paths 13b, and the second nozzles 24b may discharge the inks in the custom colors. Optionally, the second nozzles 24b in the second nozzle lines 22a, the second nozzles 24b in the second nozzle lines 22b, the second nozzles 24b in the second nozzle lines 22c, and the second nozzle lines 22b in the second nozzle lines 22d may discharge inks in different custom colors. For example, the second nozzles 24b in the second nozzle lines 22a may discharge ink in red, the second nozzles 24b in the second nozzle lines 22b may discharge ink in green, the second nozzles 24b in the second nozzle lines 22c may discharge ink in blue, and the second nozzles 24b in the second nozzle lines 22d may discharge ink in gold. For another example, the second nozzles 24b in the second nozzle lines 22a, the second nozzles 24b in the second nozzle lines 22b, the second nozzles 24b in the second nozzle lines 22c, and the second nozzle lines 22b in the second nozzle lines 22d may discharge ink in a same custom color. In the latter arrangement, the printing apparatus 10 may have the second tank 12b of a single type, and the second nozzles 24b in the second nozzle lines 22a-22d may be continuous with the second tank 12b so that the second nozzles 24b in the second nozzle lines 22a-22d may discharge the same ink therefrom.

As shown in FIG. 3, each head 20 has a plurality of driving elements 25. The driving elements may be, for example, piezoelectric devices, heating devices, and electrostatic actuators. The driving elements are provided to the nozzles 24 on one-on-one basis and may apply pressure that causes the ink in the nozzles 24 to be discharged through the nozzles 24.

<Controller, Display, Input Device>

The printing apparatus 10 includes, as shown in, a display 14, an input device 15, a colorimeter 16, and a controller 50. The controller 50 may be a computer having an interface 51, a computation unit 52, and a storage 53. The interface 51 may receive data including image data transmitted from an external device B including, for example, a computer, a camera, a communication network, a storage medium, a display, and a printer. The image data may be raster data composing an image to be printed on the printing medium A. Optionally, the controller 50 may be an independent apparatus or may consist of a plurality of distributed devices that cooperate with one another to work as the printing apparatus 10.

The storage 53 is a memory device accessible by the computation unit 52 and includes a RAM and a ROM. The RAM may store data, such as the data received from the external device B and data converted by the computation unit 52, temporarily. The ROM may store computer programs, which may be used to process the data, and predetermined types of data, including data indicating predetermined correspondences. Optionally, the computer programs may be stored in an external storage medium, which is different from the storage 53 but is accessible to the computation unit 52, such as a CD-ROM.

The computation unit 52 includes at least one circuit such as a processor, e.g., CPU, and an integrated circuit, e.g., ASIC. The computation unit 52 may run the computer programs to control the devices in the printing apparatus 10 and execute operations such as a printing operation in the printing apparatus 10. The operations to be executed in the printing apparatus 10 will be described further below.

The controller 50 is electrically connected with the display 14 and the input device 15. The display 14 may be controlled by the controller 50 to display images such as an image to be printed in the printing operation. The input device 15 may be, for example, buttons and a mouse, which may be operated by the user to input data to the controller 50. Optionally, the input device 15 may be a touch panel, which is formed integrally with the display 14. Further, optionally, the input device 15 may be the interface 51, through which external information may be entered. The colorimeter 16 may be, for example, a spectrophotometer, which may measure colors of patches in patch chart P printed on the printing medium A and input values of the measured colors to the controller 50.

Moreover, the controller 50 is electrically connected to a conveyer motor 32 of the conveyer 30 through a conveyer-driving circuit 33 and may control activation of the conveyer motor 32. Thus, the conveyer 30 may be controlled to convey the printing medium A. Furthermore, the controller 50 is electrically connected to the movable-device motor 43 of the movable device 40 through a movable-device driving circuit 46 and may control activation of the movable-device motor 43. Thus, the movable device 40 may be controlled to move the heads 20.

Moreover, the controller 50 is electrically connected to the driving elements 25 though a head-driving circuit 26. The controller 50 may output controlling signals for the driving elements 25 to the head-driving circuit 26, and the head-driving circuit 26 may generate driving signals based on the controlling signals and output to the driving elements 25. The driving elements 25 may be driven according to the driving signals, and the inks may be discharged through the nozzles 24.

<Printing Operation>

The controller 50 in the printing apparatus 10 may acquire the image data composing an image C and execute a printing operation based on the acquired image data. For example, the controller 50 may execute a pass process, in which the heads 20 are moved rightward or leftward and the inks are discharged from the heads 20 at the printing medium A, and a conveying process, in which the printing medium A is conveyed frontward. The controller 50 may repeat the pass process and the conveying process alternately to execute the printing operation, thereby the image C may be printed in the inks on the printing medium A.

The image C may be printed on the printing medium A directly without a layer of foundation intervening between the image C and the printing medium A. When no foundation is printed on the printing medium A, the controller 50 may operate the first heads 21 to discharge the inks in the basic colors through the first nozzles 24a and the second heads 22 to discharge the ink in the custom color through the second nozzles 24b to print the image C on the printing medium A. Thereby, the image C may be printed in the inks in the basic colors and the custom color on the printing medium A.

Meanwhile, the image C may be printed on the printing medium A with a layer of foundation intervening between the image C and the printing medium A. For forming the layer of foundation between the image C and the printing medium A, the printing apparatus 10 may form the layer of foundation on the printing medium A before the image C is printed. In particular, in order for the image C to be printed on the foundation, the controller 50 may acquire an area for forming the foundation from the image data composing the image C. The controller 50 may operate the third heads 23 to discharge the ink in the foundation color through the third nozzles 24c to form the foundation on the printing medium A. Thereafter, the controller 50 may operate the first heads 21 to discharge the inks in the basic color through the first nozzles 24a and the second heads 22 to discharge the ink in the custom color through the second nozzles 24b to form the image C over the foundation. Thus, image C may be printed in the inks in the basic colors and the custom color over the foundation on the printing medium A.

<Control over Printing Apparatus>

Figure 4:
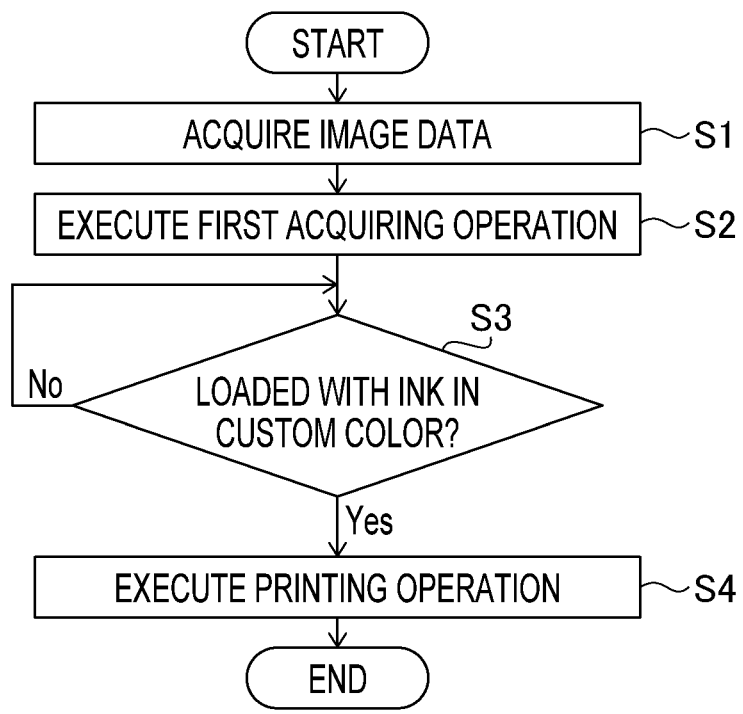
FIG. 4 is a flowchart to illustrate a controlling flow of steps to be executed in the printing apparatus.
Figure 5:
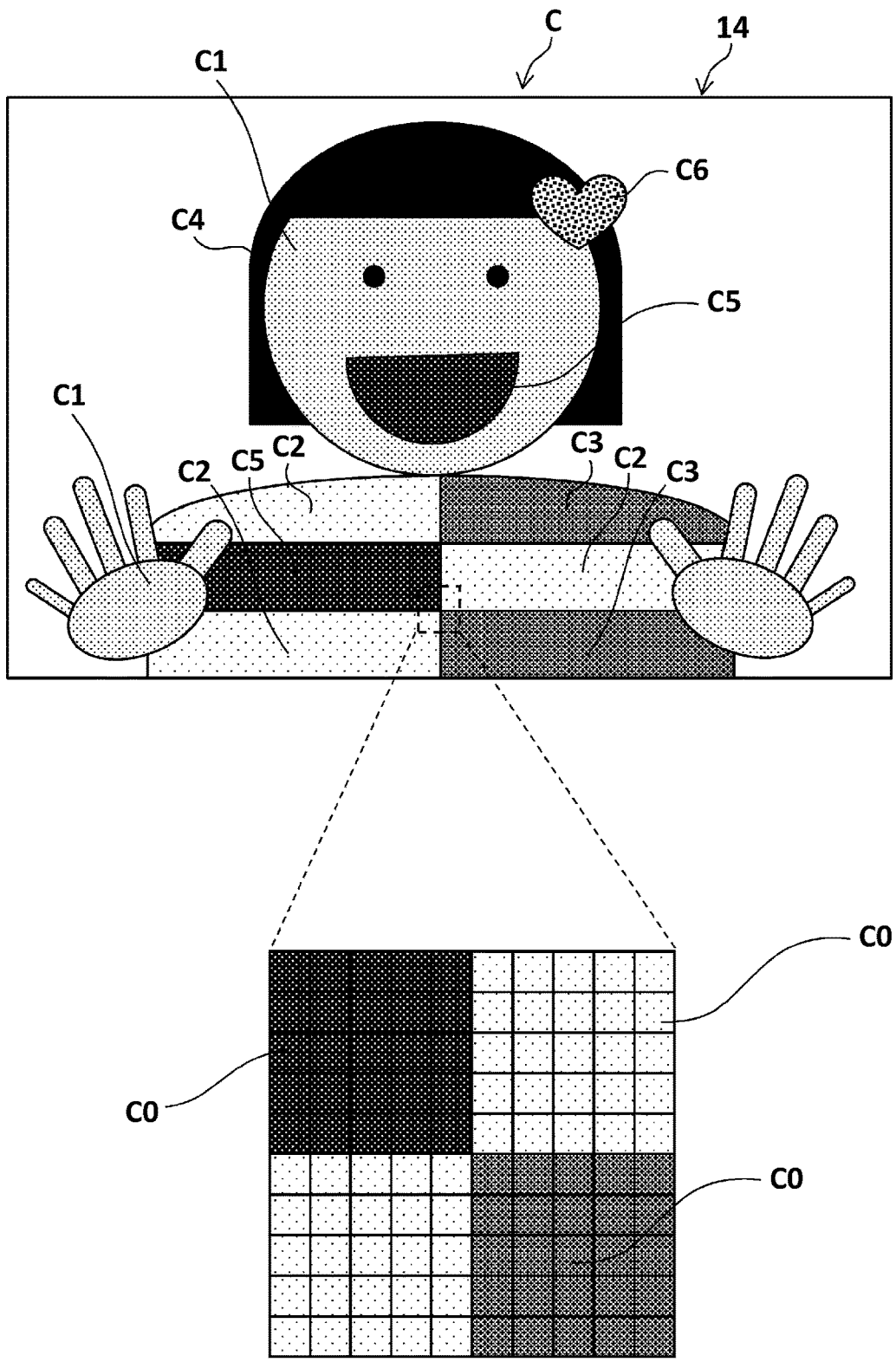
FIG. 5 illustrates an image composed of image data acquired in a first acquiring operation in the controlling flow.

The controller 50 may control the printing apparatus 10 according to a controlling method, for example, as illustrated in a flowchart shown in FIG. 4. For example, the controller 50 acquires the image data composing the image C, which is usable for printing the image C as shown in FIG. 5, from the external device B (S1). The image C is composed of a plurality of pixels, which are divided into blocks of pixels c0. The image data contains information of color values of the pixels c0. The color values may be expressed in color coordinates in a device-dependent color space such as, for example, RGB values in RGB color space. An RGB value expresses a color by a combination of a red color value, which is in a scale of 256 levels, a green color value, which is in a scale of 256 levels, and a blue color value, which is in a scale of 256 levels.

Figure 6:
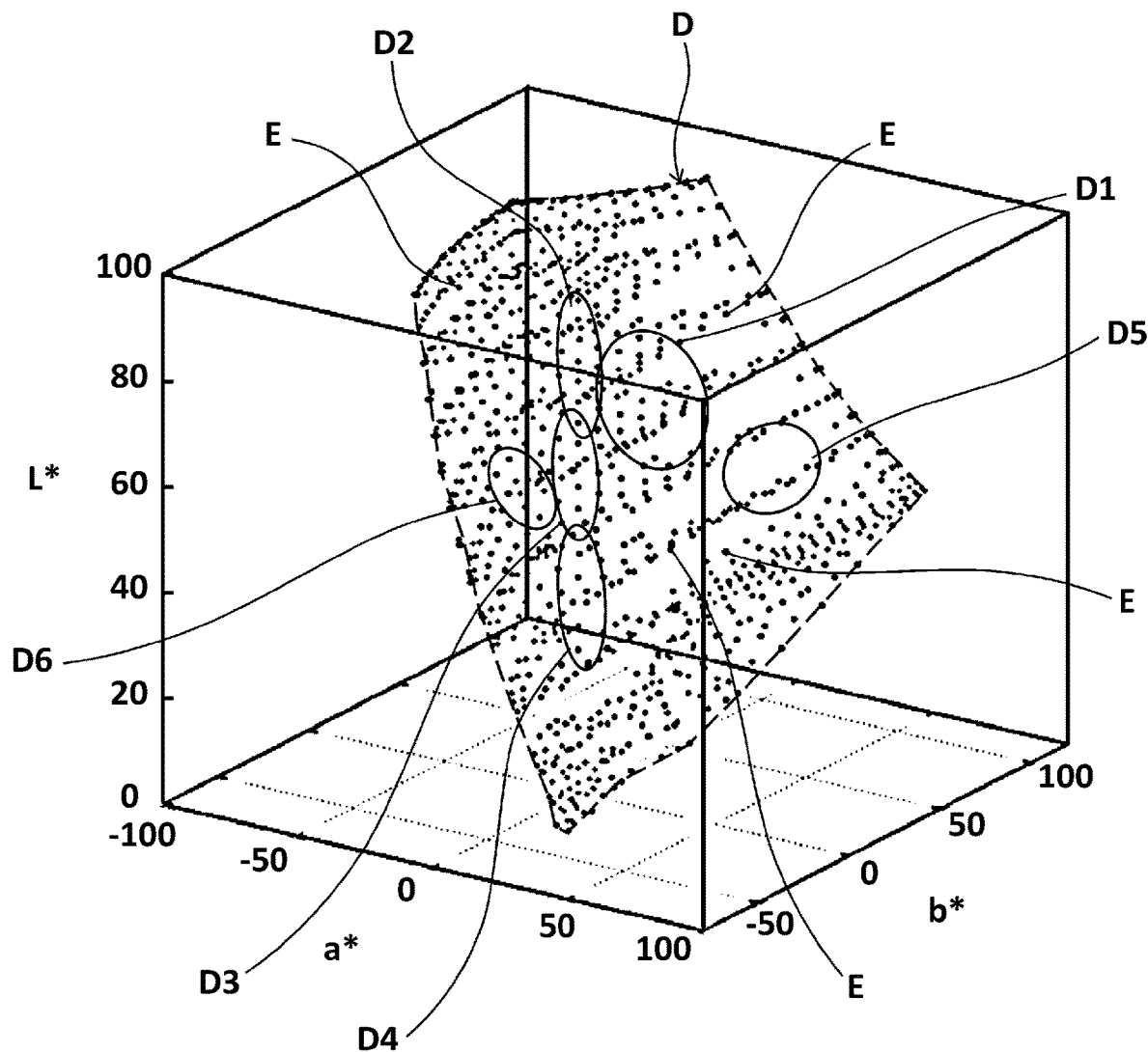
FIG. 6 illustrates an imaging color gamut of the image shown in FIG. 5 expressed in L*a*b* color space.

Next, the controller 50 converts the acquired RGB values of the pixels c0 to Lab values based on predetermined correspondence between the RGB values and the Lab values. The Lab values are color values in a device-independent L*a*b color space in coordinates where L represents brightness, a represents hue, and b represents saturation. For example, as shown in FIG. 6, imaging color values E being the Lab values of the entire pixels c0 included in the image C may be drawn in the L*a*b* color space. The L*a*b* color space contains an imaging color gamut D, which is a closed range including the imaging color values E of the entire pixels c0 in the image C.

The image C as shown in FIG. 5 includes parts C1, which are in colors of pale orange, forming a face and hands; parts C2, which are in colors of light gray, forming parts of a garment; parts C3, which are in colors of dark gray, forming another part of the garment; parts C4, which are in colors of black, forming hair and eyes; parts C5, which are in colors of red, forming a mouth and another part of the garment; and a part C6, which is in colors of blue, forming a barrette. Meanwhile, in the L*a*b* color space shown FIG. 6, color gamuts D1-D6 being gamuts of the color values of the parts C1-C6 fall within the imaging color gamut D. Each of the color gamuts D1-D6 includes one or more color values.

Next, before the second flow paths 13b are loaded with the ink in the custom color, the controller 50 executes a first acquiring operation, in which the controller 50 acquires a first printing color gamut F1 within a printing color gamut F (S2). The printing color gamut F includes the color values of the colors printable by the heads 20 in the inks in the custom color and the basic colors, and within the printing color gamut F, the first printing color gamut F1 is a gamut including color values of the custom color.

In particular, in S2, the controller 50 acquires the color values of the basic colors from the storage 53 and acquire basic color values G2, which are color values of the colors printable by the heads 20 in the inks in the basic colors. For example, in a case where the printing apparatus 10 is printable with the inks of cyan, magenta, yellow, and black, the basic color values G2 include color values of at least one color among these four colors of cyan, magenta, yellow, and black. The basic color values G2 may include color values of both unmixed plain colors of cyan, magenta, yellow, and black, and mixed colors composed of two or more colors of cyan, magenta, yellow, and black. The basic color values G2 may be, for example, expressed in CMYK values being coordinates in a device-dependent CMYK color space. A CMYK value expresses a color by a combination of a cyan color value, a magenta color value, a yellow color value, and a black color value, which are in predetermined scales.

Moreover, in S2, the controller 50 acquires, when a color value of the custom color is stored in the storage 53, the color value of the custom color from the storage 53 as a custom color value G1. When, on the other hand, the color value of the custom color is not stored in the storage 53, the controller 50 acquires the custom color value G1 through, for example, the input device 15 or the interface 51. The custom color value G1 may be expressed in, for example, an RGB value or a CMYK value.

Further, in S2, the controller 50 converts the acquired basic color values G2 in the CMYK format into Lab values based on a predetermined correspondence between the CMYK values and the Lab values and stores the correspondence between the CMYK values and the Lab values of the basic color values G2 in the storage 53. Moreover, when the custom color value G1 is defined in, for example, the RGB format, the controller 50 converts the RGB value of the custom color into a Lab value based on a predetermined correspondence between the RGB values and the Lab values. When, for another example, the custom color value G1 is defined in the CMYK format, the controller 50 converts the CMYK value of the custom color into the Lab value based on the predetermined correspondence between the CMYK values and the Lab values. The controller 50 stores the correspondence between the RGB value or the CMYK value of the custom color value G1 and the Lab value in the storage 53.

Figure 7:
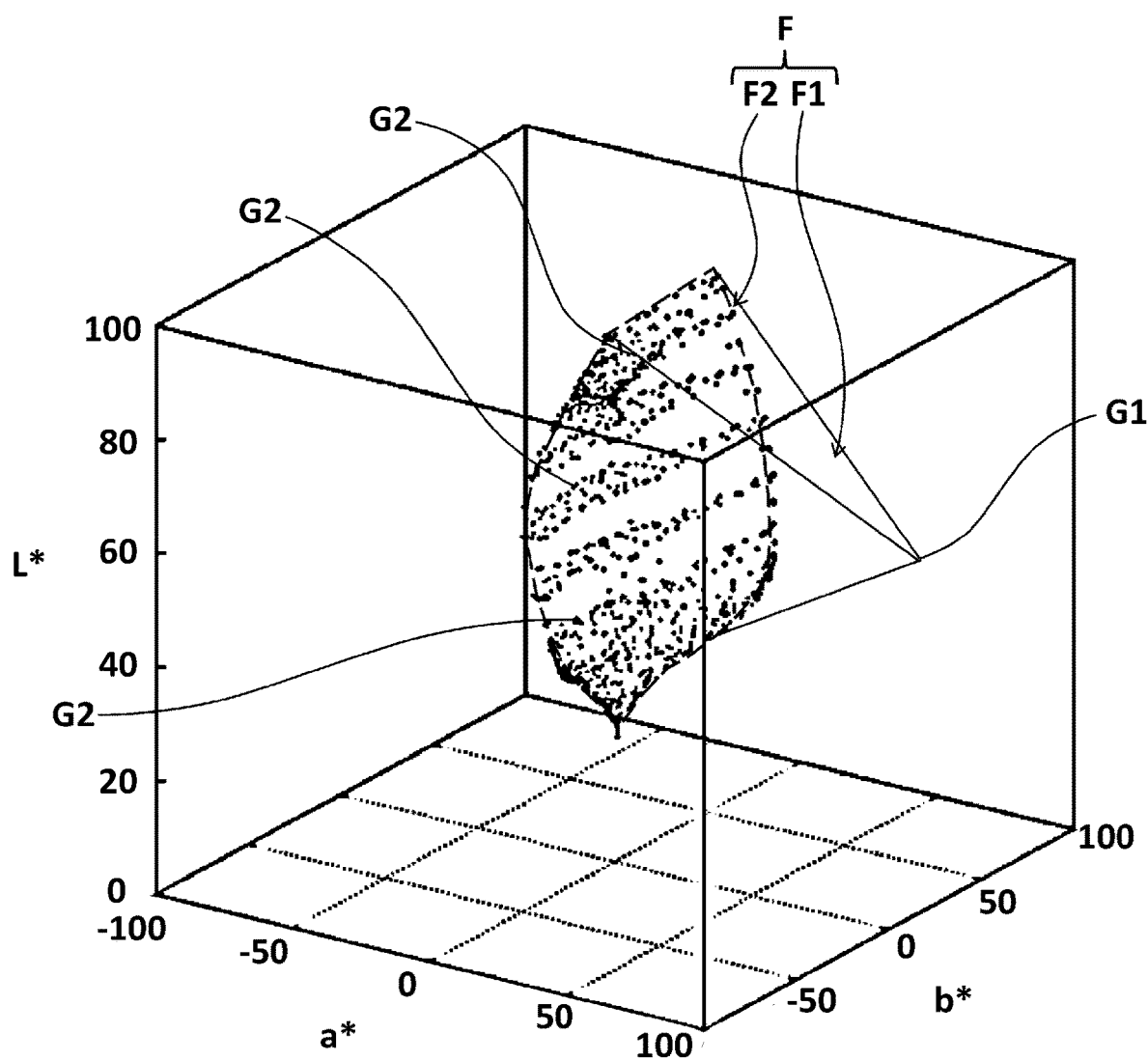
FIG. 7 illustrates a printing color gamut of red expressed in the L*a*b* color space.

Furthermore, in S2, the controller 50 draws the basic color values G2 in the L*a*b* color space, as shown in FIG. 7. The controller 50 acquires a second printing color gamut F2, which is a gamut in the L*a*b* color space including the entire basic color values G2. The second printing color gamut F2 is a closed range in the L*a*b* color space and contains the entire basic color values G2.

Moreover, in S2, in a case where the custom color is, for example, red, the controller 50 draws the custom color value G1 being a Lab value of the custom color red in the L*a*b color space. Based on the second printing color gamut F2 and the custom color value G1, the controller 50 acquires the first printing color gamut F1, which is extended from the second printing color gamut F2 by the custom color value G1 in the L*a*b* color space. The first printing color gamut F1 may be, for example, a largest one of spaces among spaces enclosed by the second printing color gamut F2 and lines drawn from the custom color value G1 to the second printing color gamut F2. The color values in the first printing color gamut F1 may include the unmixed plain color of the custom color red and mixed colors composed of the basic colors and the custom color red. The controller 50 acquires a printing color gamut F, in which the second printing color gamut F2 and the first printing color gamut F1 are combined. The printing color gamut F is a gamut, which includes the color values of the colors printable by the heads 20 in the inks in the custom color and the basic colors, in a predetermined color space, e.g., the L*a*b* color space.

Next, the controller 50 determines whether the second flow paths 13b are loaded with the ink in the custom color (S3). The controller 50 may determine, for example, based on an ink-drawing process. The ink-drawing process is a process, in which the preservative solution filling the second heads 22 is purged and replaced with the ink in the custom color. Therefore, when the process to purge the preservative solution from the second nozzles 24b in the second heads 22 is executed, the controller 50 may determine that ink-drawing process with the custom color ink is executed, and the second flow paths 13b are loaded with the custom color ink (S3: YES). On the other hand, when the process to purge the preservative solution from the second nozzles 24b in the second heads 22 is not executed, the controller 50 may determine that ink-drawing process with the custom color ink is not executed, or the second flow paths 13b are not loaded with the custom color ink (S3: NO).

Next, after the first acquiring operation, and after the second flow paths 13b being loaded with the custom color ink (S3: YES), the controller 50 executes a printing operation (S4), in which patches for first imaging color values E1 are printed on the printing medium A. The first imaging color values E1 are color values that fall within the first printing color gamut F1 among the color values in the image data.

Figure 9:
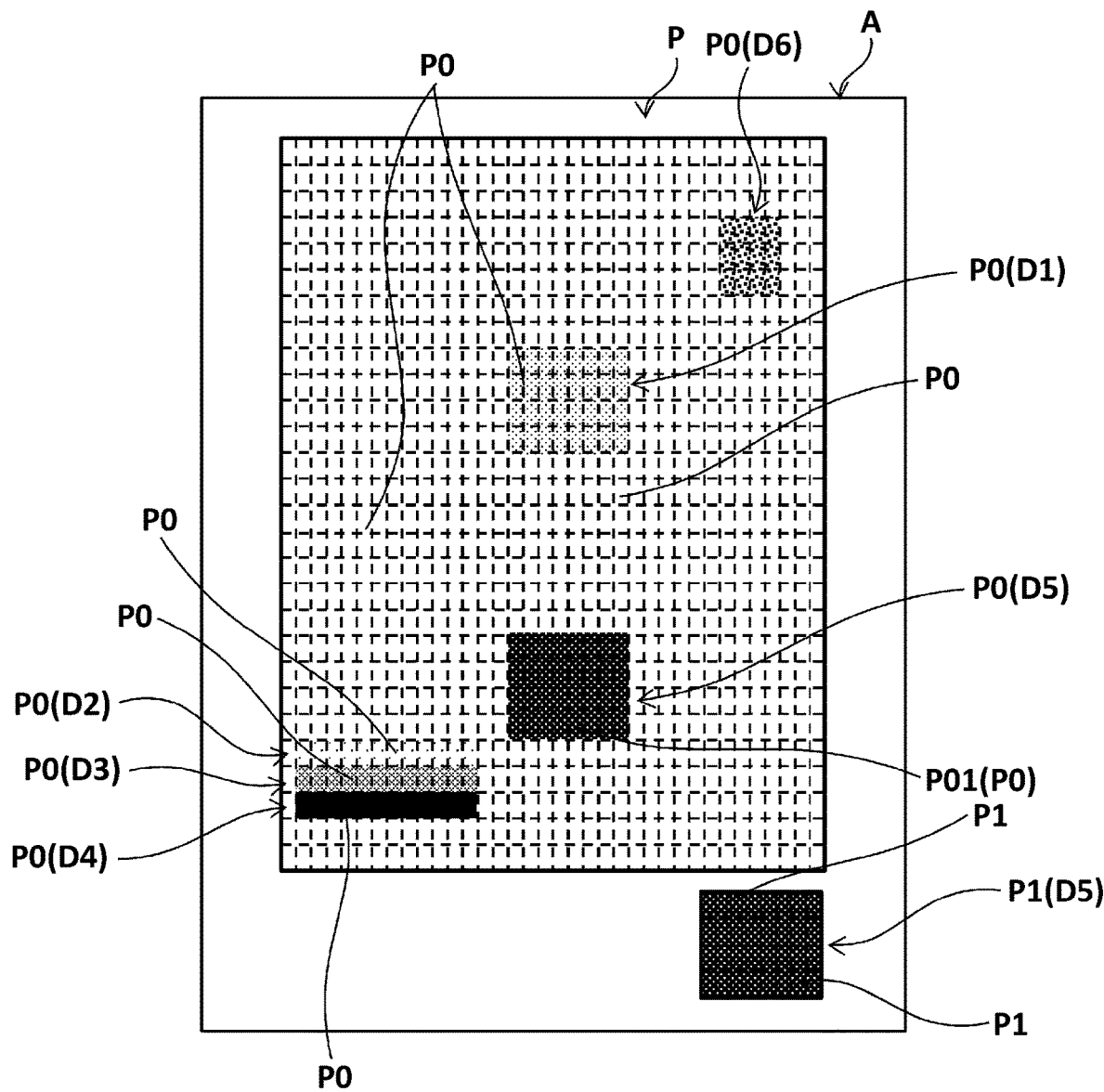
FIG. 9 illustrates a printing medium with a patch chart printed thereon in a printing operation in the controlling flow shown in FIG. 4.
Figure 9:
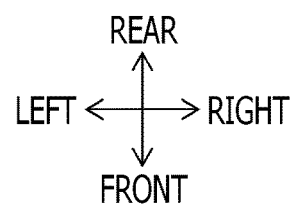

Prior to the printing operation, the user may load the second tanks 12b with the ink in the custom color. The second tanks 12b may be loaded with the ink in the custom color, and the ink may flow from the second tanks 12b and supplied to the second nozzles 24b in the second heads 22. Thus, the ink in the custom color may be ready to be discharged from the second nozzles 24b. Meanwhile, the controller 50 generates image data for a patch chart P as shown in FIG. 9. The patch chart P includes a plurality of printing patches P0 and one or more first imaging patch(es) P1. Each patch p is a color indication having, for example, a rectangular form and may be in a size, by which the colorimeter 16 may measure the color thereof. The form and the size of the patches may be determined in advance according to a resolution of the colorimeter 16.

For generating the image data composing the patch chart P, the controller 50 acquires printing color values, each of which is a color value for one of the printing patches P0. In particular, the controller 50 may acquire gradation levels of the printing color gamut F in predetermined increments for each of L, a, and b values and combine the acquired gradation levels to acquire the Lab values of the printing color gamut F. These Lab values of the printing color gamut F are acquired as the printing color values for the printing patches P0. The printing color values are values representing the printing color gamut F in gradations varied at predetermined increments and are different from one another. Further, the controller 50 acquires the first imaging color value E1 being the color values for the first imaging patches P1. In particular, the controller 50 may acquire the first imaging color values E1, which are imaging color values E falling within the first printing color gamut F1 among the imaging color values E in the imaging color gamut D in the L*a*b color space. The first imaging color values E1 fall within the printing color gamut F; therefore, some of the printing patches P0 have the same colors as the colors in the first imaging patches P1. These printing patches P0 having the same colors as the colors in the first imaging patches P1 are first patches P01. In other words, the printing patches P0 include the first patches P01.

Figure 8:
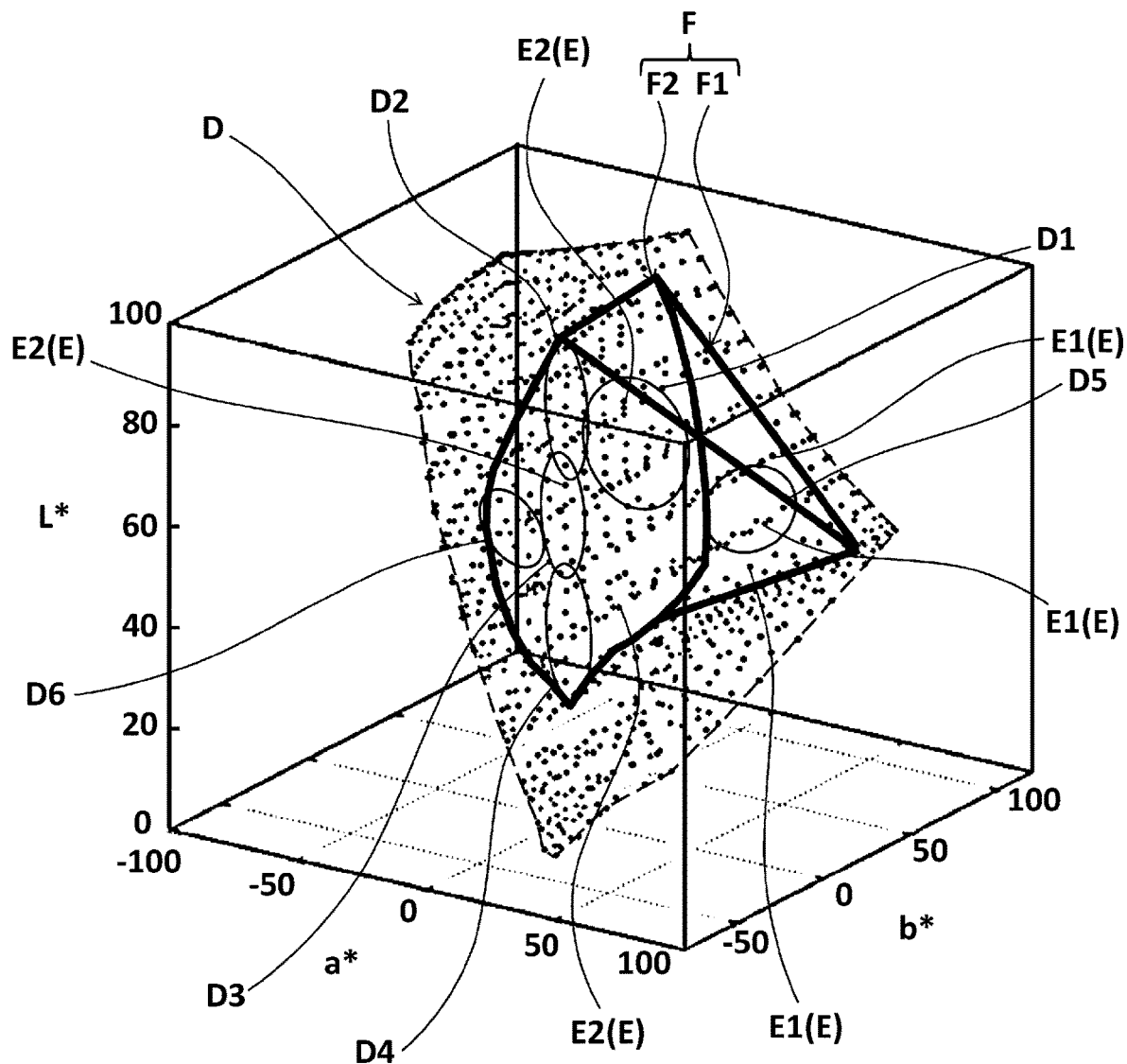
FIG. 8 illustrates the imaging color gamut shown in FIG. 6 and the printing color gamut shown in FIG. 7 combined in the same L*a*b* color space.

As shown in FIG. 8, the imaging color gamut D may include the imaging color values E that fall outside the printing color gamut F. In such a case, the controller 50 may execute the color-compressing operation to the imaging color values E. For example, the controller 50 may execute the color-compressing operation, such as gamut mapping. For example, in the color-compressing operation, the controller 50 may convert the imaging color value E outside the printing color gamut F into one of the color values within the printing color gamut F at a closest distance from the imaging color value E in the L*a*b color space. The converted color value may be an intersection between an outline of the printing color gamut F and a line drawn perpendicularly from the imaging color value E. Thus, the color-compressing operation may convert the imaging color value E outside the printing color gamut F into a color value inside the printing color gamut F. Thereby, the controller 50 may acquire, among the imaging color values E in the imaging color gamut D, the first imaging color values E1 being the imaging color values E that fall within the first printing color gamut F1.

Moreover, in S3, the controller 50 locates the printing patches P0 and the first imaging patch P1 in the patch chart P in an arrangement such that the printing patches P0 and the first imaging patch P1 are printed on a single piece of printing medium A. In particular, the controller 50 may locate the first patches P01 and the first imaging patches P1 in the patch chart P in an arrangement such that the first patches P01, which are some of the printing patches P0 having the same colors as the first imaging patches P1, and the first imaging patches P1 are printed at positions different from each other in one of the front-rear direction, the widthwise direction, and both the front-rear and widthwise directions, on the printing medium A.

Thus, the controller 50 may print the patch chart P on the printing medium A based on the image data, in which the color values and the locations of the printing patches P0 and the first imaging patches P1 are defined. In order to enable printing of the patch chart P on the printing medium A, the controller 50 converts the Lab values of the printing color values within the printing color gamut F and the first imaging color values E1 of the first imaging patches P1 into the color values in the format consisting of the CMYK and custom colors according to the predetermined correspondence. The color values converted from the printing color values and the first imaging color value E1 are color coordinates in the color space on the axes of cyan, magenta, yellow, black, and the custom colors and may express each color by a combination of a cyan color value, a magenta color value, a yellow color value, a black color value, and a custom color value in predetermined scales. Thereby, the printing patches P0 and the first imaging patches P1 may be printed in the inks in the colors, which include unmixed plain colors of cyan, magenta, yellow, black, and the custom color, and mixed colors composed of at least two of these plain colors.

In the example shown in FIG. 9, the printing patches P0 form a printing patch group P0 (D1), a printing patch group P0 (D2), a printing patch group P0 (D3), a printing patch group P0 (D4), a printing patch group P0 (D5), and a printing patch group P0 (D6). The printing patch group P0 (D1) includes one or a plurality of printing patches P0, each of which has a color value falling within the color gamut D1, and the plurality of printing patches P0 in the printing patch group P0 (D1) have color values different from one another within the color gamut D1. Similarly, each of the printing patch groups P0 (D2)-(D6) includes one or a plurality of printing patches P0, each of which has a color value within the respective color gamut D2-D6, and the plurality of printing patches P0 in the printing patch groups P0 (D2)-(D6) have color values different from one another within the respective color gamuts D2-D6.

Meanwhile, a first imaging patch group P1 (D5) includes one or a plurality of first imaging patches P1, each of which has one of the first imaging color values E1 in the color gamut D5. The plurality of first imaging patches P1 in the first imaging patch group P1 (D5) have first imaging color values E1, which are different from one another within the color gamut D1. The printing patch group P0 (D5) includes the first patches P01, each of which is the printing patch P0 having the same color as one of the first imaging color values E1 in the first imaging patch group P1 (D5).

The first imaging patch group P1 (D5) and the printing patch group P0 (D5) are printed on the same printing medium A. The first imaging patch group P1 (D5) may be located frontward from the printing patch group P0 (D5) in the front-rear direction and rightward from the printing patch group P0 (D5) in the widthwise direction. In other words, the first imaging patches P1 in the first imaging patch group P1 (D5) and the first patches P01 in the printing patch group P0 (D5) are located at different positions on the printing medium A.

The controller 50 may, for example, measure the colors of the printing patches P0 and the first imaging patches P1 in the patch chart P printed on the printing medium A, link the measured values with the color values of the patches P0, P1, and store the measured values and the color values of the patches P0, P1 linked with each other in the storage 53. Based on the linkage between the measured values and the color values of the patches P0, P1, the controller 50 may create a calibration profile for calibrating the colors so that the image C may be printed in colors closer to intended colors. While creating the calibration profile, the first imaging patch group P1 (D5) and the printing patch group P0 (D5) have patches having the same colors; therefore, a plurality of colorimetric values may be acquired from the same color value. In this occasion, the controller 50 may take an average value among the plurality of colorimetric values to create the calibration profile.

As a number of the patches in the same color increases, colorimetric errors may be reduced. In this regard, a number of the patches having the colors within the color gamut D5, which includes colors to be used in the image C and includes the custom color, is greater than a number of the other patches; therefore, colorimetric errors in the patches that include the custom color may be reduced. Moreover, the first imaging patches P1 and the first patches P01 having the same colors are located at different positions on the printing medium A in the front-rear direction and in the widthwise direction. Therefore, colorimetric errors due to positional difference within the printing medium A may be reduced. Accordingly, reliability of the calibration profile using the custom color, additionally to the basic colors, may be improved, and reproducibility of the image C may be improved.

First Modified Example

A first modified example of the embodiment will be described below. In the printing apparatus 10 in the first modified example, which may be modified from the embodiment described above, the controller 50 may execute a second acquiring operation before the second flow paths 13b are loaded with the ink in the custom color. In the second acquiring operation, the controller 50 may acquire a second printing color gamut F2, which is a gamut falling within the printing color gamut F but not including the custom color. The controller 50 may execute a printing operation, in which patches for second imaging color values E2 and the patches for the first imaging color values E1 are printed on the printing medium A. The second imaging color values E2 are color values falling within the second printing color gamut F2 among the color values included in the image data.

Figure 10:
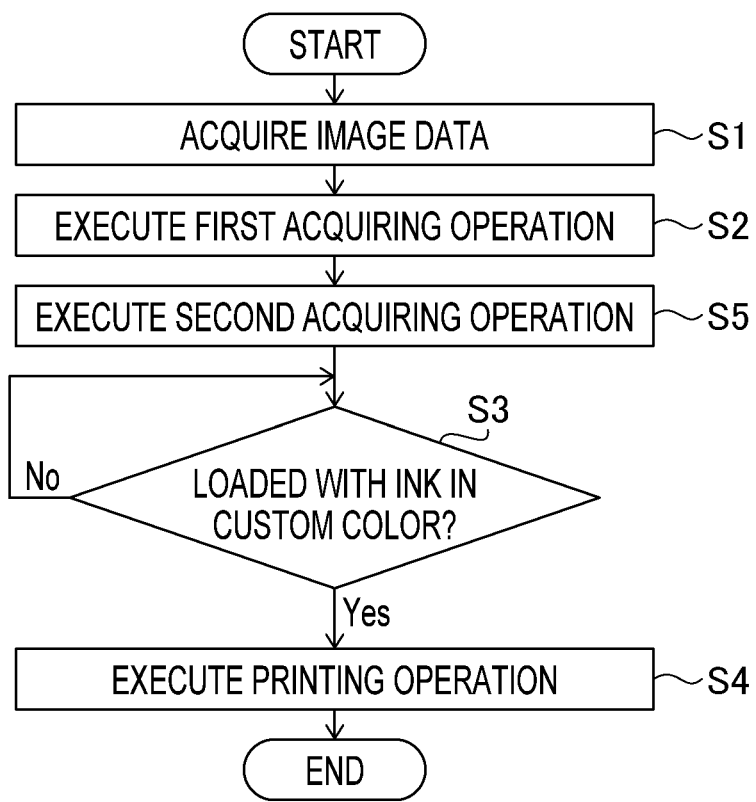
FIG. 10 is a flowchart to illustrate a first modified example of the controlling flow of steps to be executed in the printing apparatus.

For example, the printing apparatus 10 may be operated by the controller 50 according to a controlling flow as shown in FIG. 10. The flowchart shown in FIG. 10 has a second acquiring operation S5 between S2 and S3 in the flowchart shown in FIG. 4.

In particular, in the second acquiring operation (S5), the controller 50 may acquire the second printing color gamut F2, which is a gamut, as shown in FIG. 8, in the L*a*b color space including the entire lab values of the basic colors but not including the lab values of the custom color.

Figure 11:
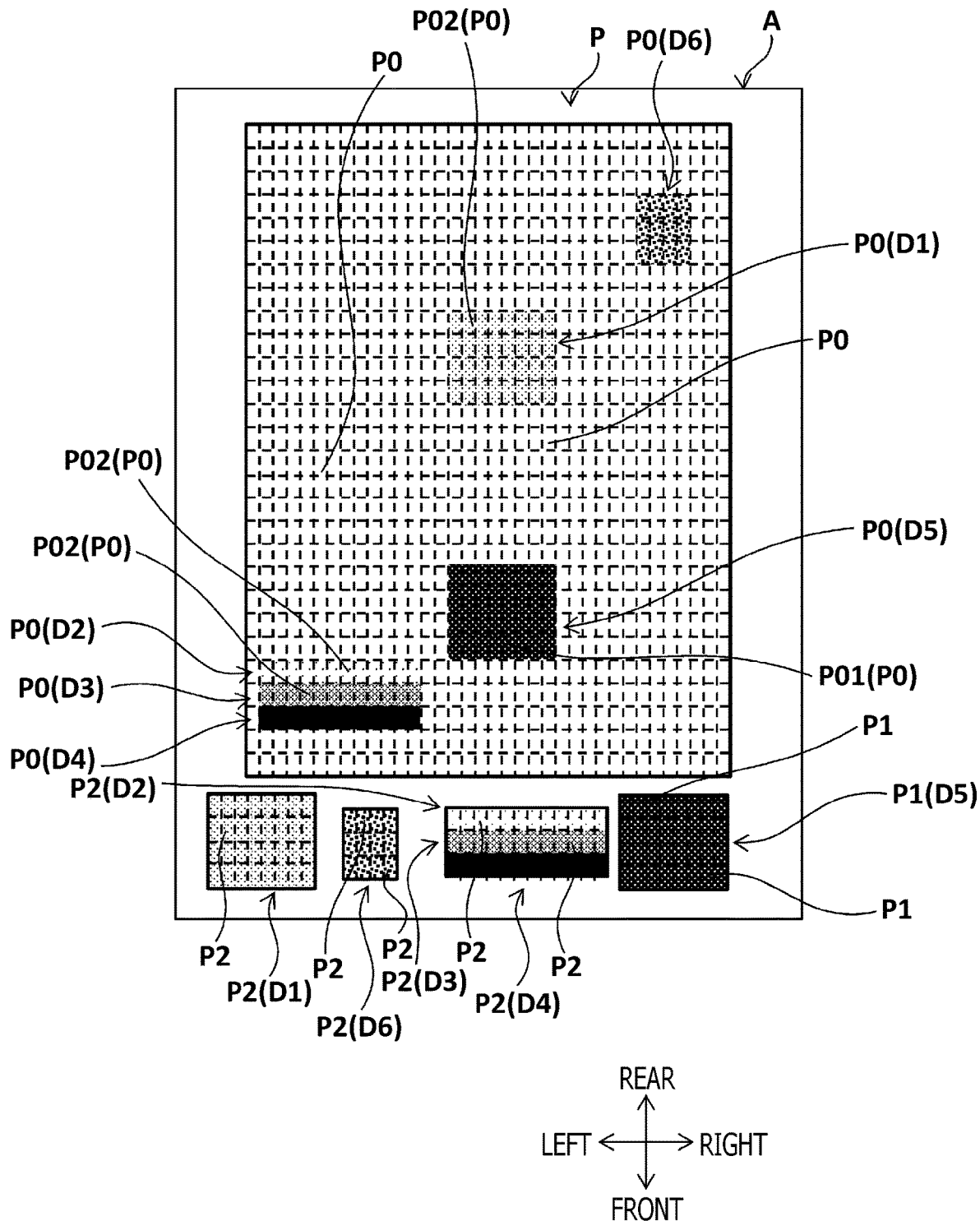
FIG. 11 illustrates a printing medium with a patch chart printed thereon in a printing operation in the controlling flow shown in FIG. 10.

Next, the controller 50 may execute a printing operation (S4). In the printing operation, the controller 50 may generate image data of a patch chart P as shown in FIG. 11. The patch chart P includes a plurality of printing patches P0, one or a plurality of first imaging patches P1, and one or a plurality of second imaging patches P2. The controller 50 may acquire printing color values for the printing patches P0 and the first imaging color values E1 for the first imaging patches P1, in the manner as described above. Further, the controller 50 may acquire second imaging color values E2, which are imaging color values that fall within the second printing color gamut F2 among the imaging color values E in the imaging color gamut D in the L*a*b color space. The second imaging color values E2 falls within the printing color gamut F; therefore, the printing patches P0 include second patches P02, which are the printing patches P0 having the same colors as the colors of the second imaging color values for the second imaging patches P2. If, for example, the imaging color gamut D includes an imaging color value E falling outside the printing color gamut F, the controller 50 may execute the color-compressing operation to the imaging color value E before acquiring the second imaging color values E2.

Moreover, in S4, the controller 50 may locate the first imaging patches P1 and the second imaging patches P2 in the patch chart P to be printed on the same printing medium A. With regard to the second imaging patches P2, the controller 50 may locate the second patches P02 and the second imaging patches P2 in an arrangement such that the second patches P02, which are the printing patches P0 having the same colors as the second imaging patches P2 among the entire printing patches P0, and the second imaging patches P2 are printed at positions different from each other in one of the front-rear direction, the widthwise direction, and both the front-rear and widthwise directions on the printing medium A.

The controller 50 may print the patch chart P on the printing medium A based on the image data, in which the color values and the locations of the printing patches P0, the first imaging patches P1, and the second imaging patches P2 are defined. For printing the patch chart P on the printing medium A, the controller 50 may convert the Lab values of the printing color values in the printing color gamut F, the first imaging color value sE1 of the first imaging patches P1, and the second imaging color values E2 of the second imaging patches P2 into the color values in the format consisting of the CMYK and custom colors according to the predetermined correspondence. Thereby, the printing patches P0, the first imaging patches P1, and the second imaging patches P2 may be printed in the inks in the colors, which include unmixed plain colors of cyan, magenta, yellow, black, and the custom color, and mixed colors composed of at least two of these plain colors.

In the example shown in FIG. 11, the printing patches P0 form a printing patch group P0 (D1), a printing patch group P0 (D2), a printing patch group P0 (D3), a printing patch group P0 (D4), a printing patch group P0 (D5), and a printing patch group P0 (D6). Moreover, the second imaging patches P2 form a second imaging patch group P2 (D1), a second imaging patch group P2 (D2), a second imaging patch group P2 (D3), a second imaging patch group P2 (D4), and a second imaging patch group P2 (D6). The second imaging patch group P2 (D1) includes one or a plurality of second imaging patches P2, each of which has one of the second imaging color values E2 falling within the color gamut D1, and the plurality of second imaging patches P2 in the second imaging patch group P2 (D1) have color values different from one another within the color gamut D1. The printing patch group P0 (D1) includes the second patches P02, which are printing patches P0 having the same color values as the second imaging color values E2 in the second imaging patch group P2. Similarly to the second imaging patch group P2 (D1), each of the second imaging patch group P2 (D3), the second imaging patch group P2 (D4), and the second imaging patch group P2 (D6) includes one or a plurality of second imaging patches P2, each of which has the same color value as one of the second patches P02.

The second imaging patch group P2 (D1) and the printing patch group P0 (D1) may be printed on the same piece of printing medium A. The second imaging patch group P2 (D1) may be located frontward from the printing patch group P0 (D1) in the front-rear direction and leftward from the printing patch group P0 (D1) in the widthwise direction. In other words, the second imaging patches P2 in the second imaging patch group P2 (D1) and the second patches P02 in the printing patch group P0 (D1) may be located at different positions on the printing medium A. Moreover, similarly to the second imaging patch group P2 (D2), the second imaging patches P2 in each of the second imaging patch groups P2 (D2)-(D4) and (D6) may be located at positions different from the second patches P02 respectively having the same colors on the printing medium A.

Thus, each of the second imaging patch groups P2 (D1)-(D4) and (D6) has the second patches P02, each of which has a color same as one of the printing patches P0, and the first imaging patch group P1 (D5) has the first patches P01, each of which has a color same as one of the printing patches P0. Therefore, a plurality of colorimetric values may be obtained from the same color value. For each of the colors of the second patches P02 and the colors of the first patches P01, a plurality of colorimetric values may be acquired. With a larger number of colorimetric values derived from the same color, colorimetric errors concerning the color may be reduced. Moreover, the second imaging patch P2 and the second patch P02 having the same color may be located at different positions in the front-rear direction and the widthwise direction on the printing medium A; therefore, colorimetric errors due to positional difference within the printing medium A may be reduced. Accordingly, reliability of the calibration profile using the custom color additionally to the basic colors may be improved, and reproducibility of the image C may be improved.

Second Modified Example

Figure 12:
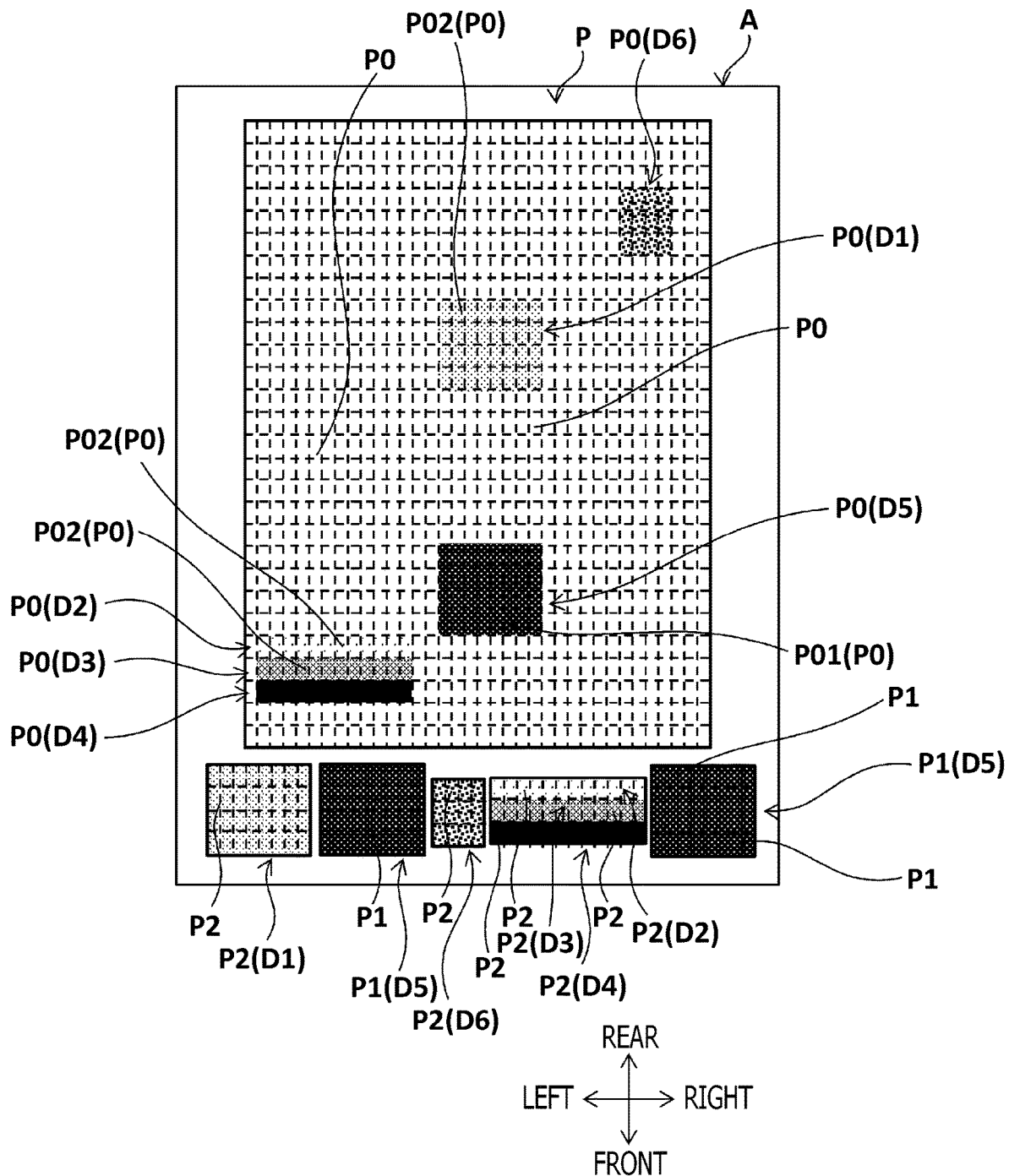
FIG. 12 illustrates a patch chart printed by the printing apparatus in a second modified example.

A second modified example of the embodiment will be described below. According to the printing apparatus 10 in the second modified example, which may be modified from the first modified example described above, a number of the patches per first imaging color value E1 may be larger than a number of the patches per second imaging color value E2. For example, as shown in FIG. 12, the patch chart P may include printing patches P0, a first imaging patch group P1 (D5), a second imaging patch group P2 (D1), a second imaging patch group P2 (D2), a second imaging patch group P2 (D3), a second imaging patch group P2 (D4), and a second imaging patch group P2 (D6).

A number of the first imaging patch groups P1 (D5) in the patch chart P may be larger than a number of the second imaging patch group P2 (D1), a number of the second imaging patch group P2 (D2), a number of the second imaging patch group P2 (D3), a number of the second imaging patch group P2 (D4), and a number of the second imaging patch group P2 (D6). For example, the number of the first imaging patch groups P1 (D5) in the patch chart P may be two (2). The printing patches P0 may include first patches P01, each of which has the same color as one of the first imaging patches P1 in the first imaging patch groups P1 (D5), and second patches P02, each of which has the same color as one of the second imaging patches P2 in the second imaging patch groups P2 (D2)-(D4) and (D6).

A number of the patches having the same color as each one of the first imaging color values E1 may be three (3): one (1) first patch P01 and two (2) first imaging patches P1. Meanwhile, a number of the patches having the same color as each one of the second imaging color values E2 may be two (2): one (1) second patch P02 and one (1) second imaging patch P2. Therefore, with regard to the number of the patches per color, the number of the first imaging patches P1 having the first imaging color value E1 is greater than the number of the second imaging patches P2 having the second imaging color value E2. Accordingly, with regard to a number of colorimetric values per color, the number of the colorimetric values from the first imaging color value E1 is larger than the number of the colorimetric values from the second imaging color value E2; therefore, errors in the colorimetric values from the first imaging color values E1 due to the positional difference within the printing medium A may be reduced. Accordingly, reliability of the calibration profile using the colorimetric values may be improved, and reproducibility of the image C may be improved.

Third Modified Example

A third modified example of the embodiment will be described below. In the printing apparatus 10 in the third modified example, which may be modified from the embodiment described earlier, the controller 50 may execute a second acquiring operation before the second flow paths 13b are loaded with the ink in the custom color. In the second acquiring operation, the controller 50 may acquire the second printing color gamut F2, which is a gamut within the printing color gamut F but not including the custom color. The controller 50 may execute a printing operation, in which the patches for the first imaging color values E1 among the color values included in the image data are printed, while the second imaging patches P2 for the second imaging color values E2 falling within the second printing color gamut F2 are not printed.

For example, in the example of the patch chart P shown in FIG. 11, among the first imaging patches P1, the second imaging patches P2, and the printing patches P0, the second imaging patches P2 may not be printed, but the first imaging patches P1 and the printing patches P0 may be printed. In this arrangement, the colorimetric values may be acquired from the first imaging patches P1 including the custom color, and the number of the colorimetric values per color from the first imaging patches P1 may be larger than the number of the colorimetric values per color from the other colors in the printing patches P0. Therefore, colorimetric errors in the measured values from the colors including the custom color may be reduced. Moreover, the positions of the first patches P01 on the printing medium A may be different from the positions of the first imaging patches P1; therefore, errors in the colorimetric values due to the positional difference within the printing medium A may be reduced. Accordingly, reliability of the calibration profile using the colorimetric values may be improved, and reproducibility of the image C may be improved.

Fourth Modified Example

A fourth modified example of the embodiment will be described below. In the printing apparatus 10 in the fourth modified example, which may be modified from the embodiment described earlier and the first through third modified examples, the controller 50 may execute the printing operation, in which the pass process and the conveying process are repeated alternately. In particular, in the pass process, the controller 50 may operate the heads 20 to discharge the inks from the first nozzles 24a and the second nozzles 24b at the printing medium A and simultaneously operate the carriage 41 to move the first nozzles 24a and the second nozzles 24b. In the conveying process, the controller 50 may operate the conveyer 30 to convey the printing medium A. According to the fourth modified example, the first patches P01 and the first imaging patches P1 may be printed in different pass processes separated by the conveying process.

Figure 13:
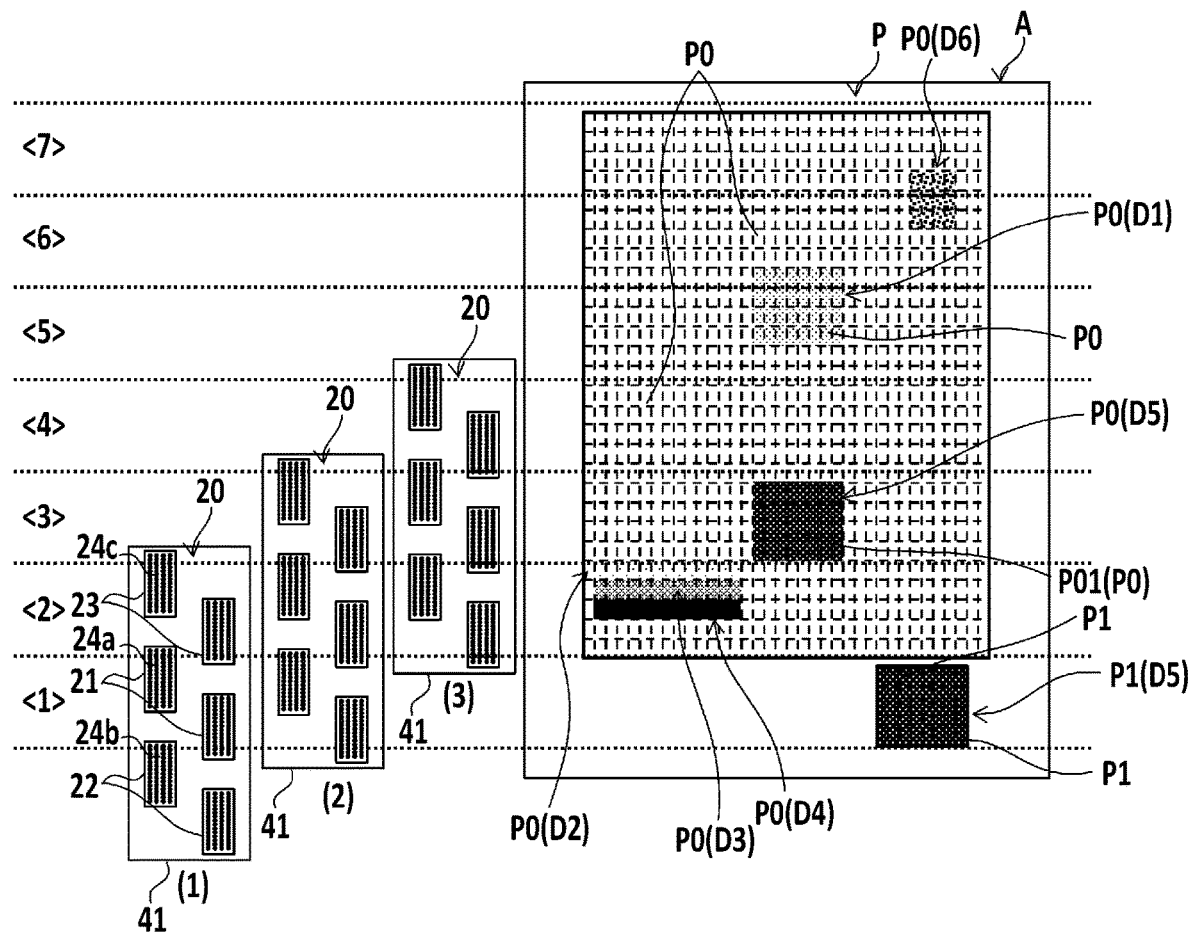
FIG. 13 illustrates positions of the heads in the printing apparatus and a patch chart printed by the heads in a fifth modified example.

For example, as shown in FIG. 13, the controller 50 may repeat the pass process and the conveying process in the printing operation to print the patch chart P in the inks in the basic colors and the custom color on the printing medium A. In a conveying process, the controller 50 may operate the conveyer 30 to convey the printing medium A to a position where positions of the heads 20 in the front-rear direction with respect to the printing medium A coincides with a position (1). In this position, the controller 50 may execute a first pass process to move the first heads 21 rightward through a zone <1> on the printing medium A and operate the first heads 21 to discharge the inks in the basic colors through the first nozzles 24a. Thereby, the inks in the basic colors may land on the printing medium A in an area of the first imaging patch group P1 (D5) in the zone <1>.

Next, in another conveying process, the controller 50 may operate the conveyer 30 to convey the printing medium A frontward from the position (1) to a position where the positions of the heads 20 in the front-rear direction with respect to the printing medium A coincide with a position (2). In this position, the controller 50 may execute a second pass process. In particular, in the second pass process, the controller 50 may move the second heads 22 leftward through the zone <1> on the printing medium A and operate the second heads 22 to discharge the ink in the custom color through the second nozzles 24b. Thereby, the inks in the custom color may land on the printing medium A in the area of the first imaging patch group P1 (D5) in the zone <1>. Further, in the second pass process, the controller 50 may move the first heads 21 leftward through the zone <2> in the printing medium A and operate the first heads 21 to discharge the inks in the basic colors through the first nozzles 24a based on the image data. Thereby, the inks in the basic colors may land on the printing medium A at the positions of the printing patches P0 in the zone <2>.

Next, in another conveying process, the controller 50 may operate the conveyer 30 to convey the printing medium A frontward from the position (2) to a position where the positions of the heads 20 in the front-rear direction with respect to the printing medium A coincide with a position (3). In this position, the controller 50 may execute a third pass process. In particular, in the third pass process, the controller 50 may move the second heads 22 rightward through the zone <2> on the printing medium A and operate the second heads 22 to discharge the ink in the custom color through the second nozzles 24b. Thereby, the ink in the custom color may land on the printing medium A at the positions of the printing patches P0 in the zone <2>. Thus, through the second and third pass processes, the printing patches P0 in the zone <2> may be printed in the inks in the basic colors and the custom color on the printing medium A. Meanwhile, in the third pass process, the controller 50 may move the first heads 21 rightward through the zone <3> on the printing medium A and operate the first heads 21 to discharge the inks in the basic colors through the first nozzles 24a. Thereby, the inks in the basic colors may land on the printing medium A at the positions of the printing patches P0 in the zone <3>.

Thus, the controller 50 may repeat the conveying process and the pass process to print the patch chart P on the printing medium A from the frontside toward the rear side. Following the third pass process, in a fourth pass process, the ink in the custom color discharged from the second nozzles 24b of the second heads 22 at the positions of the printing patches P0 in the zone <3> on the printing medium A. Through the third and fourth pass processes, the printing patches P0 in the zone <3> may be printed in the inks of the basic colors and the custom color on the printing medium A. The printing patches P0 in the zone <3> include the first patches P01 belonging to the printing patch group P0 (D5). Thus, between the first imaging patch group P1 (D5) and the printing patch group P0 (D5), the first imaging patches P1 and the first patches P01 in the same colors may be printed in the different pass processes. With the colorimetric values acquired from the first patches P01 and the first imaging patches P1 in the same colors, colorimetric errors due to different pass processes may be reduced. Accordingly, reliability of the calibration profile using the colorimetric values may be improved, and reproducibility of the image C may be improved.

Fifth Modified Example

A fifth modified example of the embodiment will be described below. In the printing apparatus 10 in the fifth modified example, which may be modified from the embodiment described earlier and the first through fourth modified examples, the controller 50 may execute the printing operation, in which the first patches P01 and the first imaging patches P1 are printed in the inks discharged from the different nozzles 24.

Figure 14:
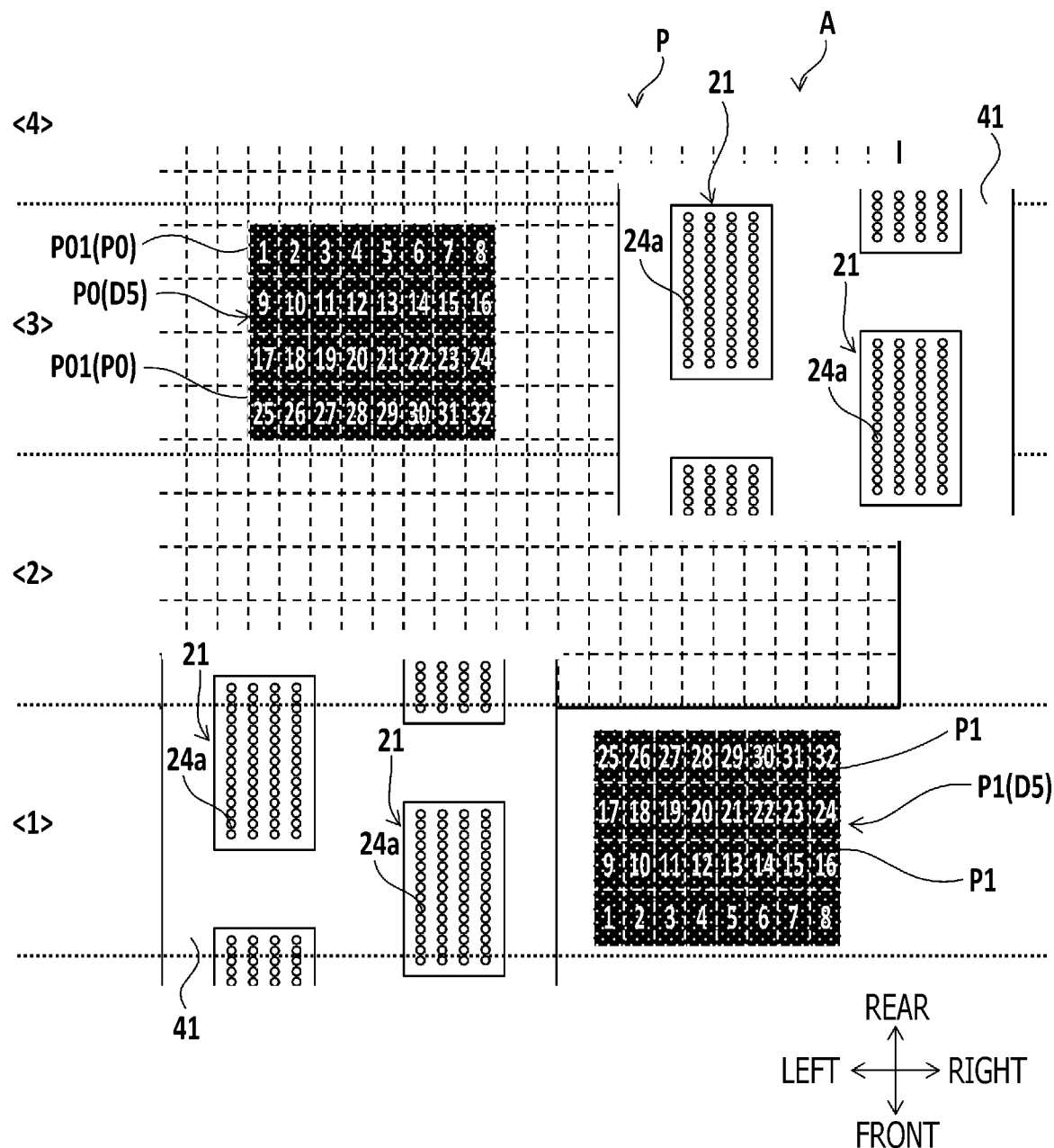
FIG. 14 illustrates heads in the printing apparatus and a part of a patch chart printed by the heads in a fifth modified example.

For example, the controller 50 may generate image data of a patch chart P as shown in FIG. 14. In the patch chart P shown in FIG. 14, the printing patch group P0 (D5) includes a plurality of, e.g., 32, first patches P01. The plurality of first patches P01 each have different color values that fall within the color gamut D5. In the printing patch group P0 (D5), the 32 first patches P01 form a grid of 8×4, i.e., four (4) rows extending from left to right, and eight (8) columns extending along the front-rear direction. The four rows include a row extending rightward from a first one of the first patches P01, a row extending rightward from a ninth one of the first patches P01, a row extending rightward from a seventeenth one of the first patches P01, and a row extending rightward from a twenty-fifth one of the first patches P01, and the four rows align in this given order from rear to front.

Meanwhile, the first imaging patch group P1 (D5) include a plurality of, e.g., 32, first imaging patches P1. The first imaging patches P1 (D5) form a grid of 8×4, i.e., four (4) rows extending from left to right, and eight (8) columns extending along the front-rear direction. The arrayed order of the rows in the front-rear direction is different between the first patches P01 in the printing patch group P0 (D5) and the first imaging patches P1 in the first imaging patch group P1 (D5). In other words, the four rows include a row extending rightward from a first one of the first imaging patches P1, a row extending rightward from a ninth one of the first imaging patches P1, a row extending rightward from a seventeenth one of the first imaging patches P1, and a row extending rightward from a twenty-fifth one of the first imaging patches P1, and the four rows are arrayed in this given order from front to rear. The first one of the first imaging patches P1 has the same color as the first one of the first patches P01. Moreover, the second and onward ones of the first imaging patches P1 have the same colors as the first and onward ones of the first patches P01, respectively.

The controller 50 may repeat the pass process and the conveying process based on the generated image data to print the patch chart P on the printing medium A. While printing the patch chart P, for example, in the third pass process, for printing the rearmost row in the printing patch group P0 (D5) starting from the first one of the first patches P01, the inks in the basic colors may be discharged from the first nozzles 24a of the first head 21 on the left, which is located rearward with respect to the first head 21 on the right. Meanwhile, in the first pass process, for printing the frontmost row in the first imaging patch group P1 (D5) starting from the first one of the first imaging patches P1, the inks in the basic colors may be discharged from the first nozzles 24a of the first head 21 on the right, which is located frontward with respect to the first head 21 on the left. Thus, for printing the first patches P01 and the first imaging patches P1 having the same colors, the inks in the basic colors may be discharged from the different first nozzles 24a at the printing medium A. Moreover, for printing the first patches P01 and the first imaging patches P1 having the same colors, the ink in the custom color may be discharged from the different second nozzles 24b at the printing medium A.

While the nozzles 24 in the heads 20 align in lines along the front-rear direction, the arrayed order of the rows of the first patches P01 in the printing patch group P0 (D5) and the arrayed order of the rows of the first imaging patches P1 in the first imaging patch group P1 (D5) in the front-rear direction are different. In this arrangement, the first patches P01 and the first imaging patches P1 having the same colors may be printed in the inks discharged from the different nozzles 24. Therefore, with the colorimetric values acquired from the first patches P01 and the first imaging patches P1 having the same color, colorimetric errors due to the difference in the nozzles 24 to be used may be reduced. Accordingly, reliability of the calibration profile using the colorimetric values may be improved, and reproducibility of the image C may be improved.

Sixth Modified Example

A sixth modified example of the embodiment will be described below. The printing apparatus 10 in the sixth modified example, which may be modified from the embodiment described earlier and the first through fifth modified examples, may have a position sensor 47 to detect a position of the carriage 41 and positions of the first nozzles 24a and the second nozzles 24b in the widthwise direction. The controller 50 may execute a printing operation, in which the first patches P01 and the first imaging patches P1 are printed in the inks discharged from the first nozzles 24a and the second nozzles 24b located at different positions.

For example, as shown in FIG. 1, the position sensor 47 may be mounted on the movable device 40. The position sensor 47 may include, for example, a linear encoder. The linear sensor may detect a position of the carriage 41 and may include an origin sensor 47a, a linear scale 47b, and a scale sensor 47c. The origin sensor 47a may be located at a predetermined position on the linear scale 47b and may have a light emitter and a light receiver. The light receiver and the light emitter may be located on one side and the other side of the carriage 41 in the front-rear direction, respectively, and the light receiver may receive the light from the light emitter when the carriage 41 is absent at the position between the light receiver and the light emitter. The position sensor 47 may acquire the origin position when the light receiver detects the carriage 41 moving in the widthwise direction intercepts the light from the light emitter.

The linear scale 47b may be an elongated bar extending in the widthwise direction and may have a plurality of light-blocking portions and a plurality of light-transmissive portions, e.g., slits. The light-blocking portions and the light-transmissive portions may align alternately in the widthwise direction. The scale sensor 47c may have a light emitter and a light receiver. The light receiver and the light emitter may be located on one side and the other side of the linear scale 47b, respectively, and the light receiver may receive the light from the light emitter when the light travels through the light-transmissive portions in the linear scale 47b. When the carriage 41 moving in the widthwise direction intercepts the light from the light emitter, the light receiver may detect the light being intercepted by the carriage 41, and the position sensor 47 may acquire a traveling distance of the carriage 41. Based on the origin position and the traveling distance, the position sensor 47 may detect the positions of the carriage 41 and the positions of the nozzles 24 in the heads 20 in the widthwise direction and output the detected positions to the controller 50. Optionally, the position sensor 47 may output the origin position and the traveling distance to the controller 50, and the controller 50 may acquire the positions of the nozzles 24 based on the origin position and the traveling distance input from the position sensor 47.

Figure 15:
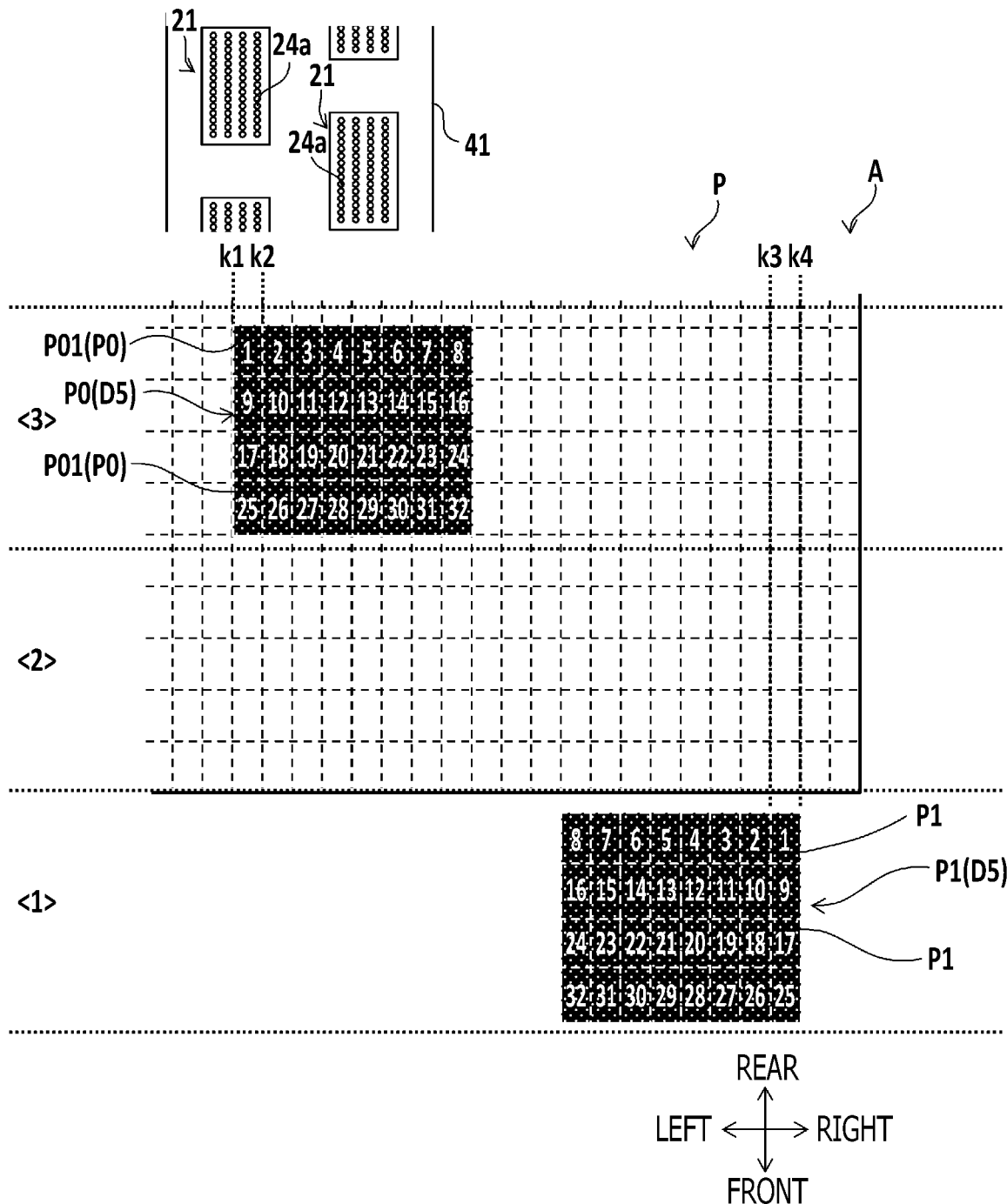
FIG. 15 illustrates the heads in the printing apparatus and a part of a patch chart printed by the heads in a sixth modified example.

For example, the controller 50 may generate image data for a patch chart P as shown in FIG. 15. In the patch chart P shown in FIG. 15, the printing patch group P0 (D5) includes a plurality of, e.g., 32, first patches P01. In the printing patch group P0 (D5), the first patches P01 form a grid of 8×4, i.e., four (4) rows extending from left to right, and eight (8) columns extending along the front-rear direction. The four rows include a row extending rightward from a first one of the first patches P01, a row extending rightward from a ninth one of the first patches P01, a row extending rightward from a seventeenth one of the first patches P01, and a row extending rightward from a twenty-fifth one of the first patches P01, and the four rows are arrayed in this given order from rear to front. Meanwhile, the first imaging patch group P1 (D5) include a plurality of, e.g., 32, first imaging patches P1. The first imaging patches P1 (D5) form a grid of 8×4, i.e., four (4) rows extending from right to left, and eight (8) columns extending along the front-rear direction. The four rows include a row extending leftward from a first one of the first imaging patches P1, a row extending leftward from a ninth one of the first imaging patches P1, a row extending leftward from a seventeenth one of the first imaging patches P1, and a row extending leftward from a twenty-fifth one of the first imaging patches P1, and the four rows are arrayed in this given order from rear to front.

The controller 50 may print the patch chart P on the printing medium A based on the image data. For example, while the first heads 21 move through a position between a position k1 and a position k2 in the widthwise direction, the inks in the basic colors discharged from the first nozzles 24*a* may land on the printing medium A at the position corresponding to the first one of the first patches P01. Further, while the second heads 22 move through the position between the position k1 and the position k2 in the widthwise direction, the ink in the custom color discharged from the second nozzles 24*b* may land on the printing medium A at the position corresponding to the first one of the first patches P01. Thus, the first patches P01 may be printed in the inks in the basic colors and the custom color.

Moreover, while the first heads 21 move through a position between a position k3 and a position k4 in the widthwise direction, the inks in the basic colors discharged from the first nozzles 24*a* may land on the printing medium A at the position corresponding to the first one of the first imaging patches P1. Further, while the second heads 22 move through the position between the position k3 and the position k4 in the widthwise direction, the ink in the custom color discharged from the second nozzles 24*b* may land on the printing medium A at the position corresponding to the first one of the first imaging patches P1. Thus, the first imaging patches P1 may be printed in the inks in the basic colors and the custom color. The position k1 and the position k2 may be located leftward with respect to the position k3 and the position k4, and the first patches P01 and the first imaging patches P1 having the same colors but located at different positions may be printed in the inks discharged from the first nozzles 24*a* and the second nozzles 24*b*, respectively. Therefore, with the first patches P01 and the first imaging patches P1 having the same color but being located at the different positions, colorimetric errors depending on the positions of the patches in the widthwise direction may be reduced. Accordingly, reliability of the calibration profile using the colorimetric values may be improved, and reproducibility of the image C may be improved.

Meanwhile, an arrayed order of the first patches P01 in the printing patch group P0 (D5) and an arrayed order of the first imaging patches P1 in the first imaging patch group P1 (D5) are different. For example, when the first heads 21 moving leftward discharge the inks through the first nozzles 24*a*, in the row starting from the first one of the first patches P01, the inks discharged from the first nozzles 24*a* may land on the printing medium A from the first one of the first patches P01 through the eighth one of the first patches P01 sequentially in an incremental order. On the other hand, when the first heads 21 moving rightward discharge the inks through the first nozzles 24*a*, in the row starting from the first one of the first imaging patches P1, the inks discharged from the first nozzles 24*a* may land on the printing medium A from the eighth one of the first imaging patches P1 through the first one of the first imaging patches P1 sequentially in a decremental order. Thus, the discharging order of the inks from the heads 20 may be different between the printing patch group P0 (D5) and the first imaging patch group P1 (D5). Therefore, with the colorimetric values acquired from the first patches P01 and the first imaging patches P1 having the same color, colorimetric errors due to the discharging order from the nozzles 24 may be reduced. Accordingly, reliability of the calibration profile using the colorimetric values may be improved, and reproducibility of the image C may be improved.

Seventh Modified Embodiment

A seventh modified example of the embodiment will be described below. In the printing apparatus 10 in the seventh modified example, which may be modified from the embodiment described earlier and the first through third modified examples, the patches of the color values in the printing color gamut F and the patches of the first imaging color values E1 may be arranged on the printing medium A at different positions determined by random numbers.

For example, for generating image data for the patch chart P, the controller 50 may acquire the Lab values of the printing color gamut F to handle as the printer color values for the printing patches P0. Further, the controller 50 may acquire the imaging color values E, which fall within the first printing color gamut F1 among the imaging color values E in the imaging color gamut D, to handle as the first imaging color values E1. The controller 50 may assign an ID to each of the printing color values and the first imaging color values E1.

Further, the controller 50 may divide the patch chart P being a closed area into a plurality of blocks and assign an ID to each of the divided blocks in an order of random numbers. A total number of the divided blocks may be greater than or equal to a sum of the number of the printing color values and the number of the first imaging color values E1. The controller 50 may link the IDs of the blocks with the IDs of the printing color values on one-to-one basis and with the IDs of the first imaging color values E1 on one-tone basis and assign the printing patches P0 each having the printing color value and the first imaging patches P1 each having the first imaging color values E1 to the linked blocks.

Based on the image data, in which the color values and the positions of the printing patches P0 and the first imaging patches P1 are thus determined, the controller 50 may print the patch chart P on a single piece of printing medium A. With the colorimetric values acquired from the first patches P01 and the first imaging patches P1 having the same color, colorimetric errors due to the positional difference of the patches may be reduced. Accordingly, reliability of the calibration profile using the colorimetric values may be improved, and reproducibility of the image C may be improved.

Eighth Modified Example

An eighth modified example of the embodiment will be described below. The printing apparatus 10 in the eighth modified example, which may be modified from the embodiment described earlier and the first through third modified examples, may execute a printing operation, in which the patches of the color values in the printing color gamut F may be printed on a first printing medium A1 being a piece of printing medium A, and the patches of the first imaging color values E1 may be printed on a second printing medium A2 being another piece of printing medium A different from the first printing medium A1. The controller 50 may locate the first patches P01 among the patches for the color values falling within the printing color gamut F, having the same color values as the patches for the first imaging color values E1, and the patches for the first imaging color values E1 in an arrangement such that the positions of the first patches P01 on the first printing medium A1 and the positions the patches for the first imaging color values E1 on the second printing medium A2 are different in one of the front-rear direction, the widthwise direction, and both the front-rear and widthwise directions.

Figure 16:
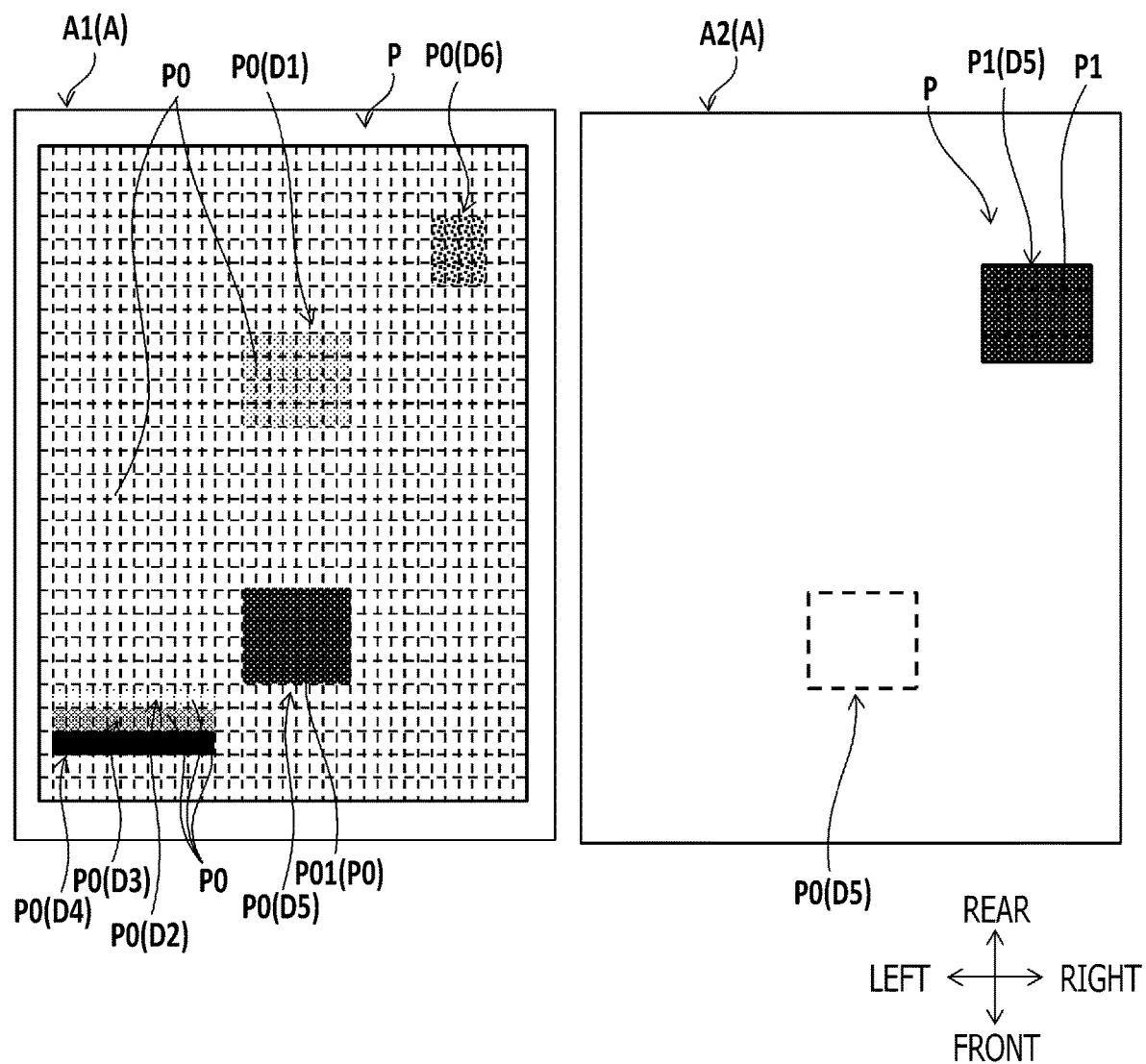
FIG. 16 illustrates heads in the printing apparatus and a part of a patch chart printed by the heads in an eighth modified example.

For example, in the printing operation in S4 in the flowchart shown in FIG. 4, the controller 50 may generate image data for the patch chart P as shown in FIG. 16. The patch chart P may include a plurality of printing patches P0 and one or a plurality of first imaging patches P1 and may be printed on a plurality of pieces of printing medium A. The plurality of pieces of printing medium A includes a first printing medium A1 and a second printing medium A2 being separate sheets. For example, the printing patches P0 may be printed on the first printing medium A1, and the first imaging patches P1 may be printed on the second printing medium A2. Optionally, the printing patches P0 may be entirely printed on a single piece of first printing medium A1 or may be divided to be on two or more pieces of printing medium A.

The printing patches P0 include first patches P01, which form the printing patch group P0 (D5) having the same colors as the first imaging patches P1 in the first imaging patch group P1 (D5). The printing patch group P0 (D5) may be printed on the first printing medium A1, and the first imaging patch group P1 (D5) may be printed on the second printing medium A2. The positions of the first patches P01 in the widthwise direction and the front-rear direction on the first printing medium A1 and the positions of the first imaging patches P1, having the same colors as the first patches P01, in the widthwise direction and the front-rear direction on the second printing medium A2 may be different. In the example shown in FIG. 16, the printed positions of the first imaging patches P1 in the first imaging patch group P1 (D5) on the second printing medium A2 are rearward and rightward with respect to positions corresponding to the printed positions of the first patches P01 in the printing patch group P0 (D5) on the first printing medium A1. The corresponding positions are positions on the second printing medium A2, which are in the same positional relation in the widthwise direction and in the front-rear direction as the first patches P01 on the first printing medium A1. For example, the corresponding positions on the second printing medium A2 may be positions, with which the first patches P01 printed on the first printing medium A1 coincide when the first printing medium A1 is laid over to fit with the second printing medium A2. In this arrangement, a number of colorimetric values per color for the first imaging color values E1 is larger than a number of colorimetric values per color for the other color values. Therefore, colorimetric errors in the patches of the first imaging color values E1 due to the positional difference on the printing medium A may be reduced. Accordingly, reliability of the calibration profile using the colorimetric values may be improved, and reproducibility of the image C may be improved.

Ninth Modified Example

A ninth modified example of the embodiment will be described below. The printing apparatus 10 in the ninth modified example, which may be further modified from the eighth modified example, may execute a printing operation, in which the first patches P01 and the patches for the first imaging color values E1 are printed in the inks discharged from the different first nozzles 24a and the inks discharged from the different second nozzles 24b.

Figure 17A:
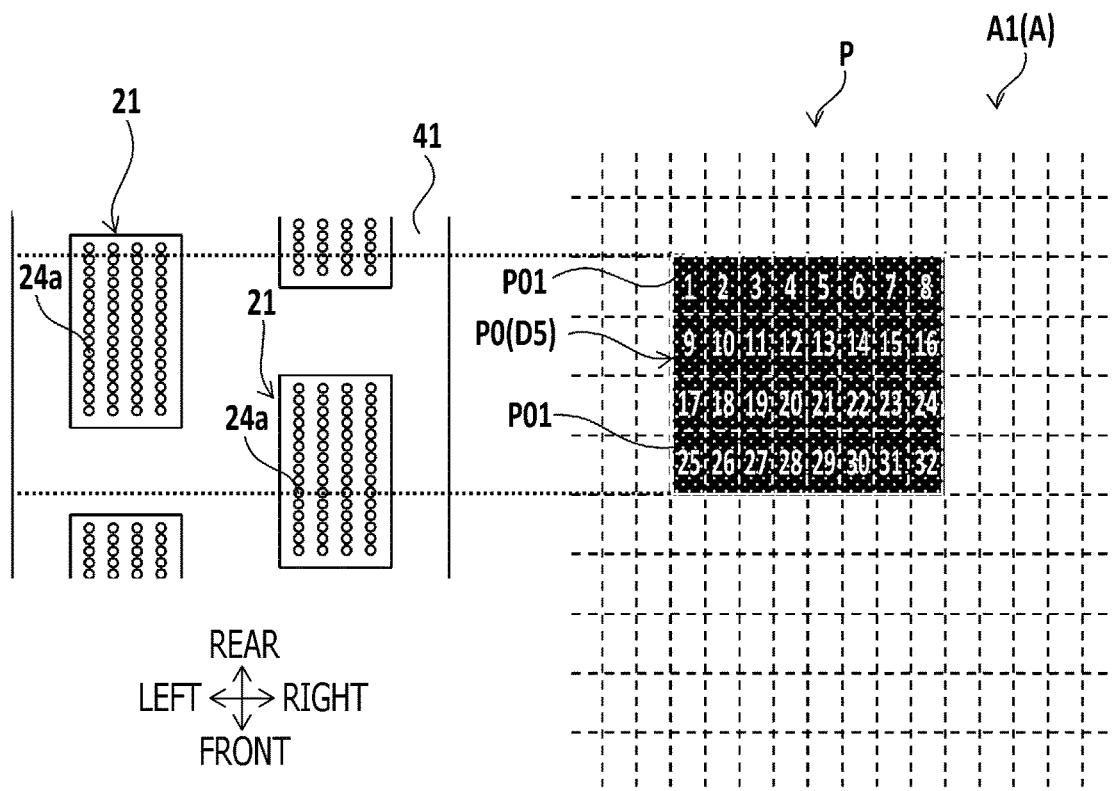
FIGS. 17A-17B illustrate positions of the heads in the printing apparatus and a part of a patch chart printed by the heads in a ninth modified example.
Figure 17B:
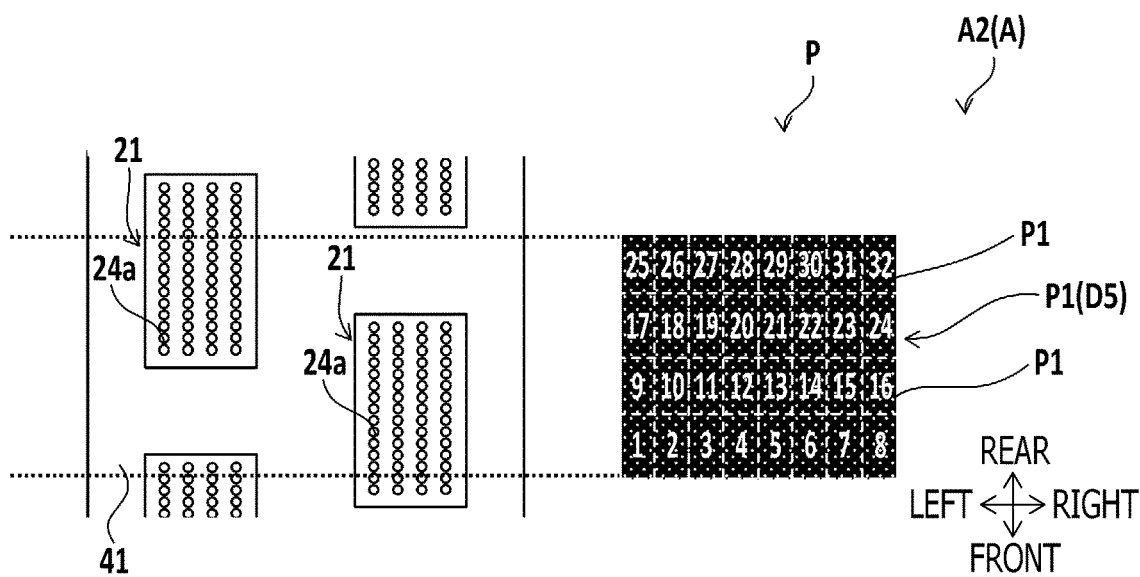

For example, as shown in FIG. 17A, the printing patch group P0 (D5) may be printed on the first printing medium A1. The printing patch group P0 (D5) includes a plurality of, e.g., 32, first patches P01. The first patches P01 form a grid of 8×4, i.e., four (4) rows extending from left to right, and eight (8) columns extending along the front-rear direction. The four rows include a row extending rightward from a first one of the first patches P01, a row extending rightward from a ninth one of the first patches P01, a row extending rightward from a seventeenth one of the first patches P01, and a row extending rightward from a twenty-fifth one of the first patches P01, and the four rows align in this given order from rear to front. On the other hand, as shown in FIG. 17B, the first imaging patch group P1 (D5) may be printed on the second printing medium A2, which is another piece of printing medium A different from the first printing medium A1. The first imaging patch group P1 (D5) includes a plurality of, e.g., 32, first imaging patches P1. The first imaging patches P1 form a grid of 8×4, i.e., four (4) rows extending from left to right, and eight (8) columns extending along the front-rear direction. The four rows include a row extending rightward from a first one of the first imaging patches P1, a row extending rightward from a ninth one of the first imaging patches P1, a row extending rightward from a seventeenth one of the first imaging patches P1, and a row extending rightward from a twenty-fifth one of the first imaging patches P1, and the four rows align in this given order from front to rear. The first one of the first imaging patches P1 have the same color as the first one of the first patches P01. Moreover, the second and onward ones of the first imaging patches P1 have the same colors as the first and onward ones of the first patches P01, respectively.

The arrayed order of the rows in the front-rear direction are different between the first patches P01 in the printing patch group P0 (D5) and the first imaging patches P1 in the first imaging patch group P1 (D5). Meanwhile, the first nozzles 24a in the first heads 21 align along the front-rear direction, and the first head 21 on the left is located rearward with respect to the first head 21 on the right. For example, for printing the rearmost row in the printing patch group P0 (D5) starting from the first one of the first patches P01, the inks in the basic colors may be discharged from the first nozzles 24a of the first head 21 on the left. On the other hand, for printing the frontmost row in the first imaging patch group P1 (D5) extending rightward from the first one of the first imaging patches P1, the inks in the basic colors may be discharged from the first nozzles 24a of the first head 21 on the right.

Thus, for printing the first patches P01 and the first imaging patches P1 having the same colors, the inks in the basic colors may be discharged from the different first nozzles 24a at the separate pieces of printing medium A1, A2. Moreover, for printing the first patches P01 and the first imaging patches P1 having the same colors, the ink in the custom color may be discharged from the different second nozzles 24b at the separate pieces of printing medium A1, A2. In this arrangement, the first patches P01 and the first imaging patches P1 having the same colors may be printed in the inks discharged from the different nozzles 24. With the colorimetric values acquired from the first patches P01 and the first imaging patches P1 having the same colors, colorimetric errors due to the nozzles 24 may be reduced. Accordingly, reliability of the calibration profile using the colorimetric values may be improved, and reproducibility of the image C may be improved.

Tenth Modified Example

A tenth modified example of the embodiment will be described below. The printing apparatus 10 in the tenth modified example, which may be modified from the embodiment described earlier and the eighth through ninth modified examples, may have the position sensor 47 to detect positions of the first nozzles 24a and the second nozzles 24b in the second direction. The controller 50 may execute a printing operation, in which the first patches P01 and the patches for the first imaging color values E1 are printed in the inks discharged from the first nozzles 24a and the second nozzles 24b located at different positions.

Figure 18A:
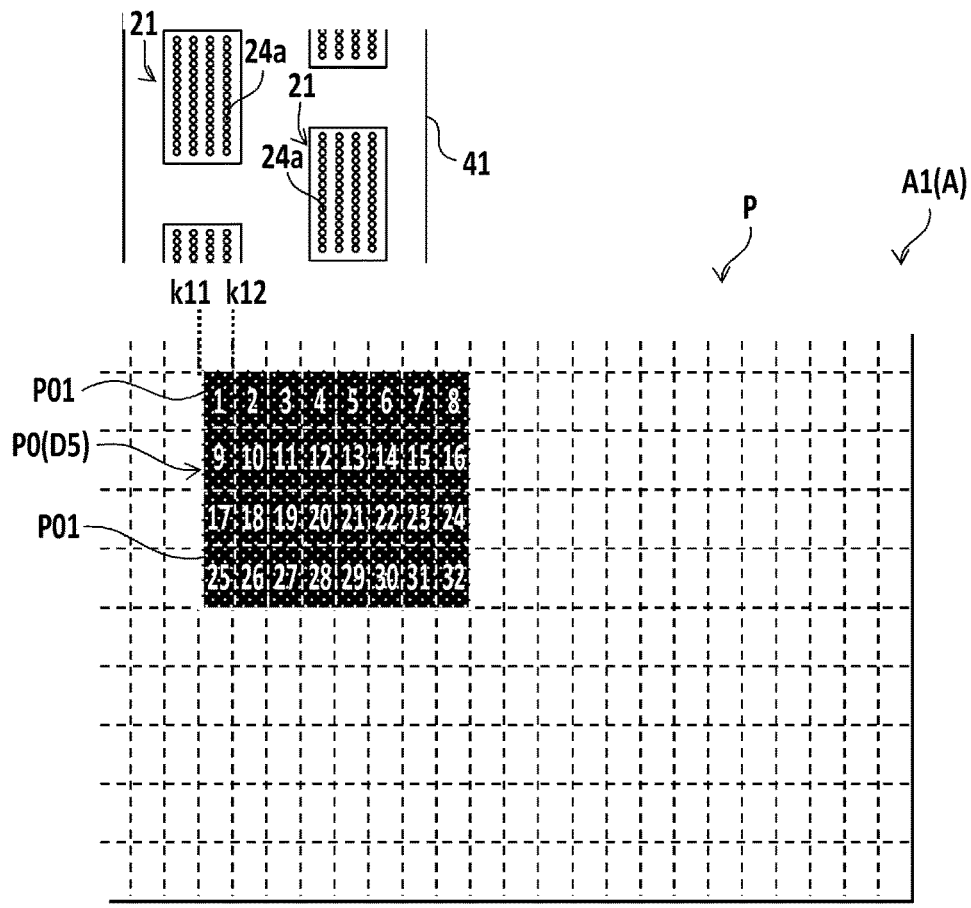
FIGS. 18A-18B illustrate the heads in the printing apparatus and a part of a patch chart printed by the heads in a tenth modified example.
Figure 18B:
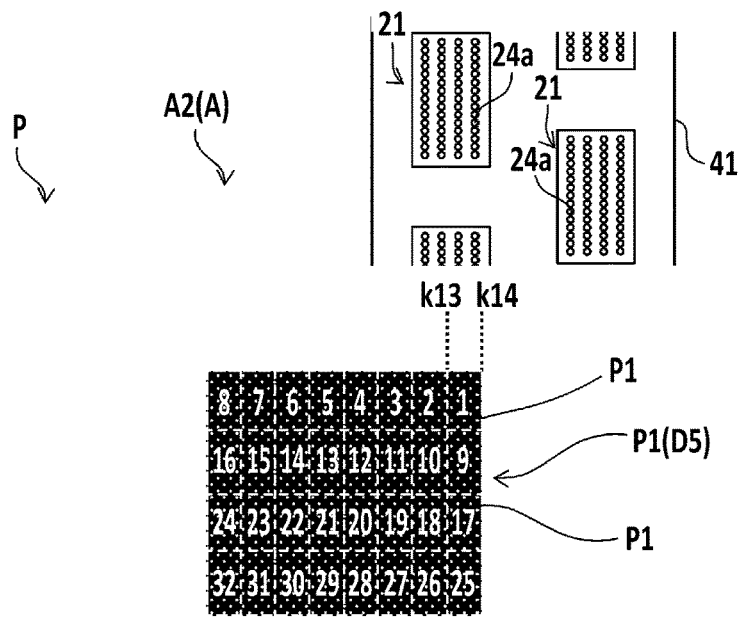

For example, the controller 50 may acquire the widthwise positions of the nozzles 24 in the heads 20 detected by the position sensor 47. As shown in FIG. 18A, the printing patch group P0 (D5) may be printed on the first printing medium A1. The printing patch group P0 (D5) includes a plurality of, e.g., 32, first patches P01. The first patches P01 form a grid of 8×4, i.e., four (4) rows extending from left to right, and eight (8) columns extending along the front-rear direction. The four rows include a row extending rightward from a first one of the first patches P01, a row extending rightward from a ninth one of the first patches P01, a row extending rightward from a seventeenth one of the first patches P01, and a row extending rightward from a twenty-fifth one of the first patches P01, and the four rows align in this given order from rear to front. On the other hand, as shown in FIG. 18B, the first imaging patch group P1 (D5) may be printed on the second printing medium A2, which is another piece of printing medium A different from the first printing medium A1. The first imaging patch group P1 (D5) includes a plurality of, e.g., 32, first imaging patches P1. The first imaging patches P1 form a grid of 8×4, i.e., four (4) rows extending from right to left, and eight (8) columns extending along the front-rear direction. The four rows include a row extending leftward from a first one of the first imaging patches P1, a row extending leftward from a ninth one of the first imaging patches P1, a row extending leftward from a seventeenth one of the first imaging patches P1, and a row extending leftward from a twenty-fifth one of the first imaging patches P1, and the four rows align in this given order from rear to front. The first one of the first imaging patches P1 have the same color as the first one of the first patches P01. Moreover, the second and onward ones of the first imaging patches P1 have the same colors as the first and onward ones of the first patches P01, respectively.

For example, as shown in FIG. 18A, while the first head 21s move through a position between a position k11 and a position k12 in the widthwise direction, the inks in the basic colors discharged from the first nozzles 24a may land on the first printing medium A1 at the position corresponding to the first one of the first patches P01. Further, while the second heads 22 move through the position between the position k11 and the position k12 in the widthwise direction, the ink in the custom color discharged from the second nozzles 24b may land on the first printing medium A1 at the position corresponding to the first one of the first patches P01. Thus, the first patches P01 may be printed in the inks in the basic colors and the custom color on the first printing medium A1. Moreover, as shown in FIG. 18B, while the first heads 21 move through a position between a position k13 and a position k14 in the widthwise direction, the inks in the basic colors discharged from the first nozzles 24a may land on the second printing medium A2 at the position corresponding to the first one of the first imaging patches P1. Further, while the second head 22 moves through the position between the position k13 and the position k14 in the widthwise direction, the ink in the custom color discharged from the second nozzles 24b may land on the second printing medium A2 at the position corresponding to the first one of the first imaging patches P1. Thus, the first imaging patches P1 may be printed in the inks in the basic colors and the custom color on the second printing medium A2.

Thus, the arrayed order of the first patches P01 in the printing patch group P0 (D5) and the arrayed order of the first imaging patches P1 in the first imaging patch group P1 (D5) are different in the widthwise direction. For example, when the first heads 21 moving rightward discharges the inks through the first nozzles 24a, in the row starting from the first one of the first patches P01, the inks discharged from the first nozzles 24a may land on the first printing medium A1 from the first one of the first patches P01 through the eighth one of the first patches P01 sequentially in an incremental order. On the other hand, when the first heads 21 moving leftward discharges the inks through the first nozzles 24a, in the row starting from the first one of the first imaging patches P1, the inks discharged from the first nozzles 24a may land on the second printing medium A2 from the eighth one of the first imaging patches P1 through the first one of the first imaging patches P1 sequentially in a descending order. Thus, the discharging order of the inks from the heads 20 may be different between the printing patch group P0 (D5) and the first imaging patch group P1 (D5). Therefore, with the colorimetric values acquired from the first patches P01 and the first imaging patches P1 having the same color, colorimetric errors due to the discharging order from the nozzles 24 may be reduced. Accordingly, reliability of the calibration profile using the colorimetric values may be improved, and reproducibility of the image C may be improved.

Eleventh Modified Example

An eleventh modified example of the embodiment will be described below. In the printing apparatus 10 in the eleventh modified example, which may be modified from the embodiment described earlier and the first through third modified examples, the controller 50 may acquire representing color values each representing one of a plurality of divided regions M in the image C. The representing color values of the divided regions M may include the first imaging color values E1. The patches of the first imaging color values E1 may be located at positions corresponding to the positions of the respective regions M in the image C on a printing medium A different from the printing medium A, on which the patches of the color values in the printing color gamut F are printed.

Figure 19:
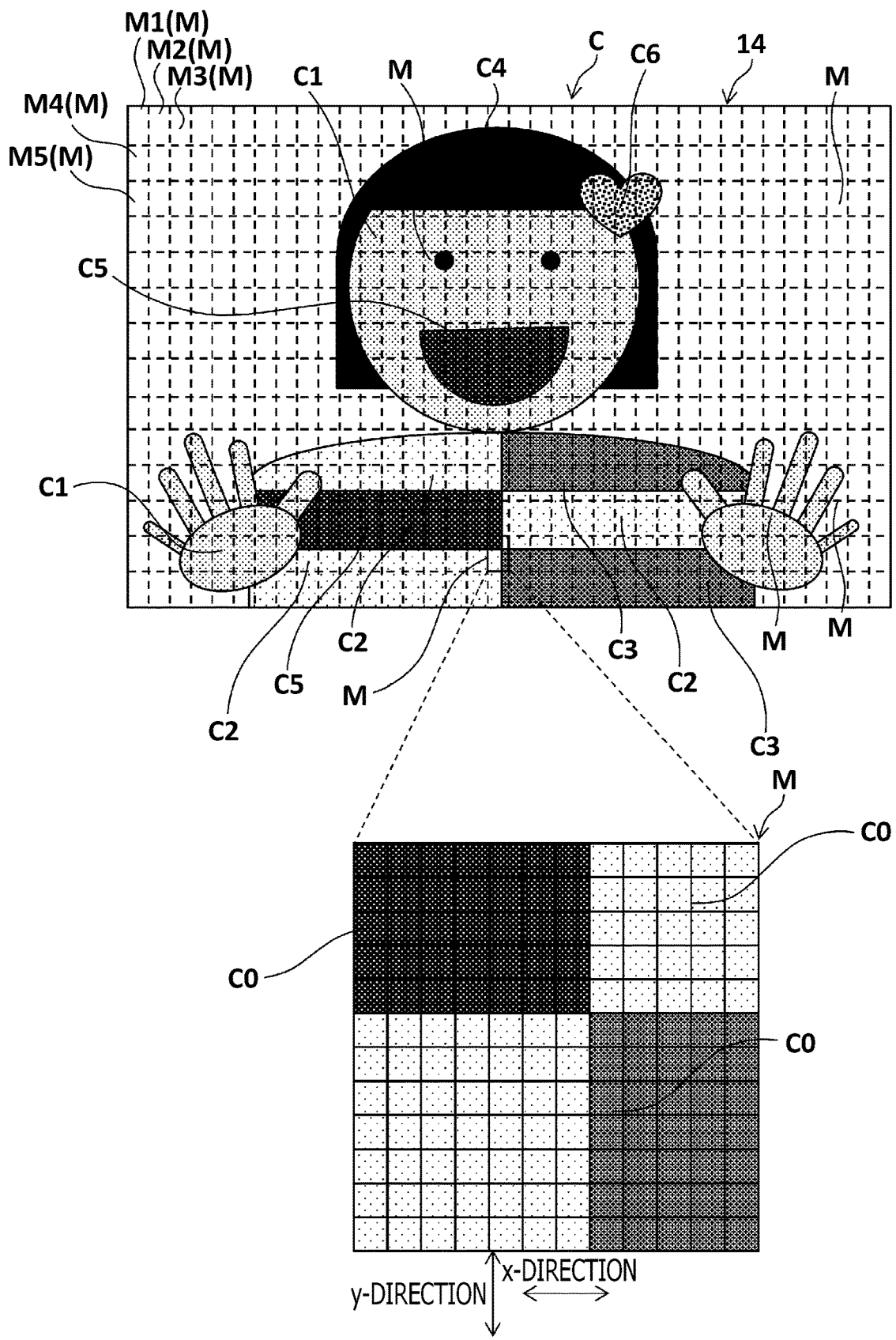
FIG. 19 illustrates an image composed of image data acquired by the printing apparatus in an eleventh modified example.
Figure 20:
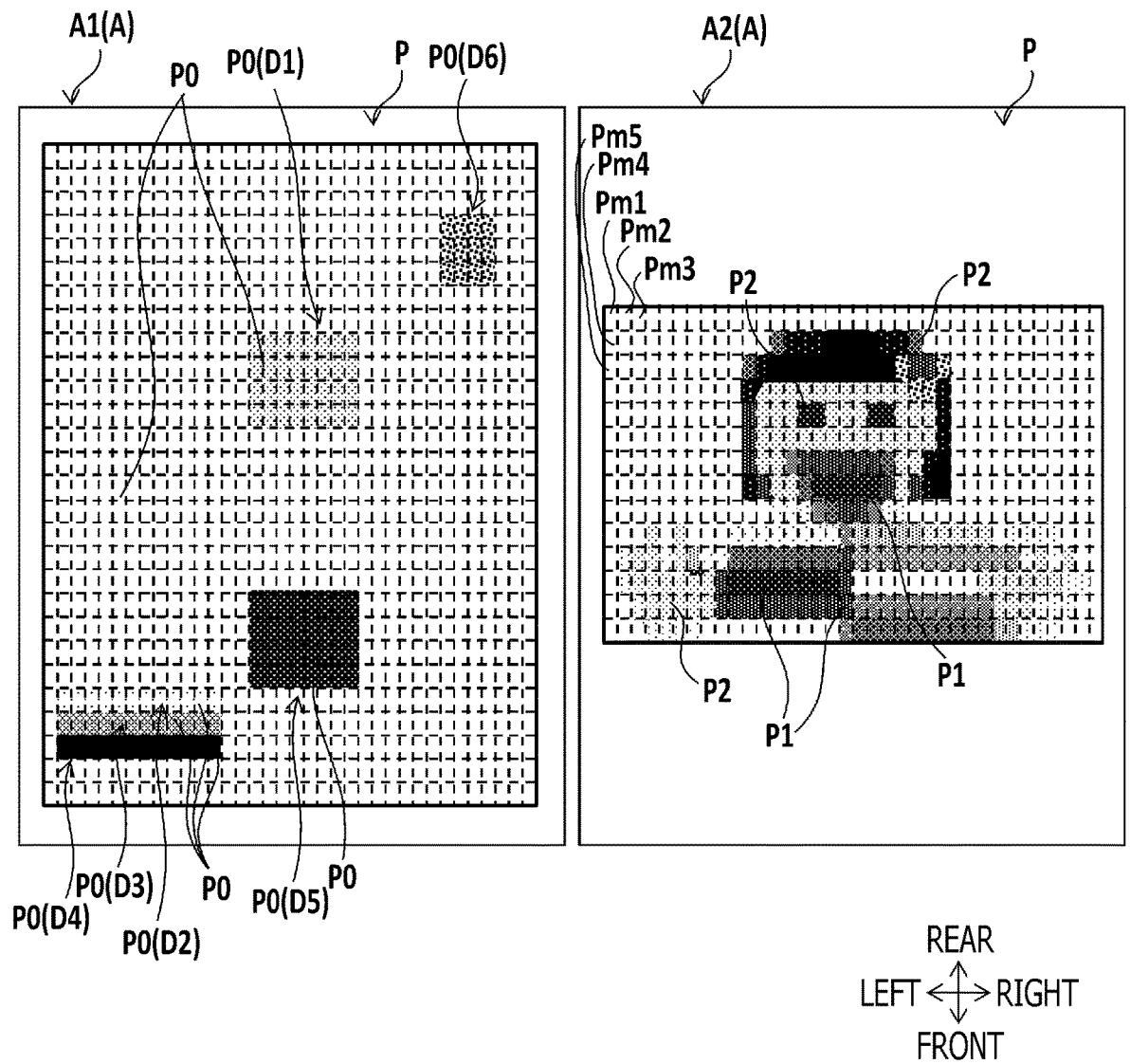
FIG. 20 illustrates patch charts printed on different pieces of printing medium according to the image data illustrated in FIG. 19.

For example, the controller 50 may acquire positions of the pixels C0 in the image C as shown in FIG. 19 and color values, e.g., RGB values, of the pixels C0 from the image data composing the image C and store the acquired positions and the color values linked with each other in, for example, the storage 53. The controller 50 may convert the RGB values of the pixels C0 into Lab values based on the predetermined correspondence between the RGB values and the Lab values. The controller 50 may acquire the converted Lab values to handle as the imaging color values E and store the acquired imaging color values E linked with the positions of the pixels C0 in, for example, the storage 53. The controller 50 may divide the image C into a plurality of regions M and acquire the imaging color values E of the pixels C0 in each region M based on the linkage between the positions of the pixels and the imaging color values E.

Further, the controller 50 may acquire representing color values that each represent colors of the regions M and store the position of each region M linked with the representing color value in, for example, the storage 53. The representing color value of each region M may be, for example, a mode value, an average value, or a median value within the imaging color values E in the region M. The representing color value may be, when the color value falls within the first printing color gamut F1, the first imaging color value E1, or may be, when the color value falls within the second printing color gamut F2, the second imaging color value E2. Therefore, the representing color values in the plurality of regions M may include the first imaging color value E1 and the second imaging color value E2. Meanwhile, when the imaging color gamut D includes the imaging color values E falling outside the printing color gamut F, the controller 50 may execute the color-compressing operation to the imaging color value E before acquiring the representing color value in the region M.

The controller 50 may generate image data for the patch chart P and print the patch chart P on the printing medium A based on the generated image data. The patch chart P includes the printing patches P0, the first imaging patches P1 being the patches for the first imaging color values E1, and the second imaging patches P2 being the patches for the second imaging color values E2. The printing patches P0 may be printed on the first printing medium A1, and the first imaging patches P1 and the second imaging patches P2 for the second imaging color values E2 may be printed on the second printing medium A2.

For generating the image data, the controller 50 may locate the first imaging patches P1 and the second imaging patches P2 in the patch chart P according to the correspondence between the positions of the regions M in the image C and the representing color values. In particular, the controller 50 may locate the first imaging patches P1, each of which has the color of the first imaging color value E1 being the representing color value representing one of the regions M, at positions corresponding to the regions M in the image C. In this arrangement, with regard to the representing color value in the region M and the first imaging color value E1in the first imaging patch P1 having the same color, the position of the region M in the image C corresponds to the position of the first imaging patch P1 on the second printing medium A2. Moreover, the controller 50 may locate the second imaging patches P2, each of which has the color of the second imaging color value E2 being the representing color value representing one of the regions M, at positions corresponding to the regions M in the image C. In this arrangement, with regard to the representing color value in the region M and the second imaging color value E2 in the second imaging patch P2 having the same color, the position of the region M in the image C corresponds to the position of the second imaging patch P2 on the second printing medium A2.

For example, arrayed orders of the first and second imaging patches P1, P2 on the second printing medium A2 along the widthwise direction and the front-rear direction are the same as arrayed orders of the regions M in the image C to be printed on the second printing medium A2 in the widthwise direction and the front-rear direction. For example, in a case of the image C, in which a region M1, a region M2, and region M3 are arrayed along the widthwise direction in this given order, an imaging patch Pm1 having the color value representing the region M1, an imaging patch Pm2 having the color value representing the region M2, and an imaging patch Pm3 having the color value representing the region M3 may be arrayed along the widthwise direction in this given order on the second printing medium A2. Moreover, in the case of the image C, in which the region M1, a region M4, and a region M5 are arrayed along the lengthwise direction in this given order, the imaging patch Pm1 having the color value representing the region M1, an imaging patch Pm4 having the color value representing the region M4, and an imaging patch Pm5 having the color value representing the region M5 may be arrayed along the lengthwise direction in this given order on the second printing medium A2. In other words, coordinates of some of the regions M on an x-axis and a y-axis in the image C may coincide with coordinates of the first imaging patches P1 having the first imaging color values E1 on the x-axis and the y-axis in the second printing medium A2, and coordinates of some of the regions M on the x-axis and the y-axis in the image C may coincide with coordinates of the second imaging patches P2 having the second imaging color values E2 on the x-axis and the y-axis in the second printing medium A2. Moreover, in mutually intersecting directions, e.g., in two directions intersecting orthogonally, the positions of regions M in the printed image C on the printing medium A may be the same as the positions of the first and second imaging patches P1, P2 having the color values representing the respective regions M on the second printing medium A2.

As a result, the first imaging patches P1 and the second imaging patches P2 may be printed on the second printing medium A2 in an appearance of mosaic-processed image C. Thus, the first imaging patches P1 and the second imaging patches P2 may be located on the second printing medium A2 at the positions according to the color values of the colors in the image C. Therefore, colorimetric errors depending on the positions of the first imaging patches P1 and the second imaging patches P2 may be reduced. Accordingly, reliability of the calibration profile using the colorimetric values may be improved, and reproducibility of the image C may be improved.

Twelfth Modified Example

Figure 21:
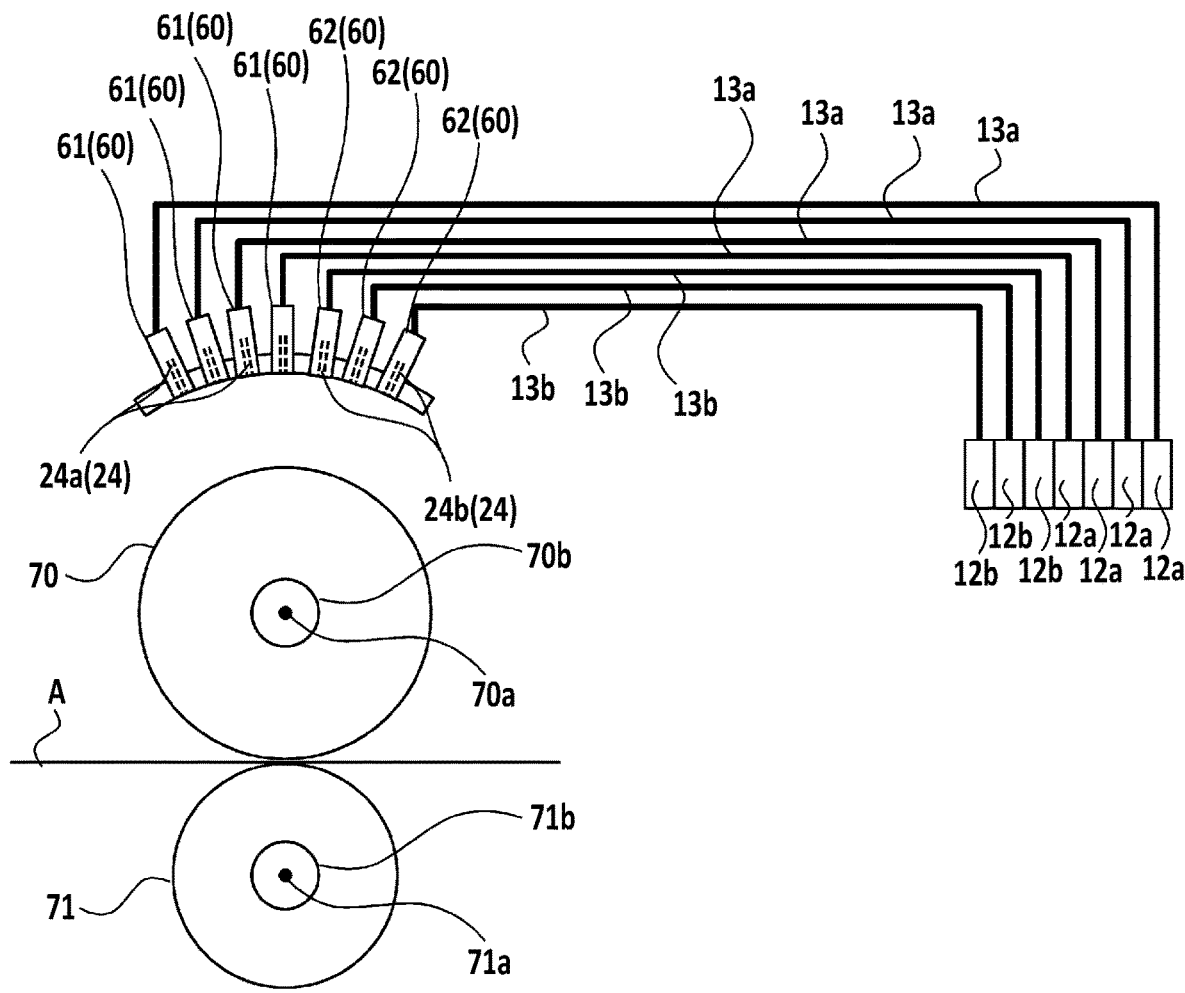
FIG. 21 is a schematic sideward view of the printing apparatus in the tenth modified example.
Figure 21:
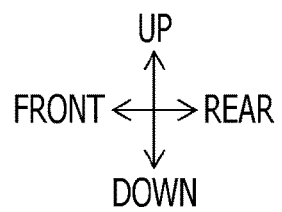

The printing apparatus 10 in a twelfth modified example, which may be modified from the embodiment described earlier and the first through eleventh modified examples, will be described below. As shown in FIG. 21, the printing apparatus 10 may have a plurality of heads 60, and a transfer drum 70 and a pressure drum 71 that may work as a conveyer. The printing apparatus 10 may operate to discharge the ink from heads 60 at the transfer drum 70 to form the image C on the transfer drum 70 and transfer the image C onto the printing medium A.

The heads 60 may be line heads, each having the plurality of nozzles 24. The plurality of nozzles 24 are arrayed in a range longer than a printable range in the printing medium A in the widthwise direction. The nozzles 24 are formed through lower surfaces of the heads 60, and the lower surfaces of the heads 60 face a surface of the transfer drum 70. For example, the heads 60 may discharge inks of different types. The heads 60 may include, for example, four (4) first heads 61 and three (3) second heads 62. Each first head 61 is continuous with one of the first tanks 12$a$ through the first flow path 13$a$ and has the first nozzles 24$a$ to discharge the ink in one of the basic colors. Each second head 62 is continuous with one of the second tanks 12$b$ through the second flow path 13$b$ and has the second nozzles 24$b$ to discharge the ink in the custom color different from the basic colors. When the second tank 12$b$ is loaded with the ink in a selected one of the custom colors, the ink in the selected custom color may flow from the second tank 12*b* through the second flow path 13*b* and may be discharged through the second nozzles 24*b*.

The transfer drum 70 has a cylindrical form having a central axis 70*a*, which extends in the widthwise direction, and may rotate on the central axis 70*a*. The plurality of heads 60 are arranged radially from the central axis 70*a* of the transfer drum 70. The pressure drum 71 has a cylindrical form having a central axis 71*a*, which extends in the widthwise direction, and may rotate on the central axis 71*a*. The transfer drum 70 and the pressure drum 71 align in the vertical direction in an arrangement such that the printing medium A may be nipped between the transfer drum 70 and the pressure drum 71.

The transfer drum 70 is provided with a transfer motor 70*b*, and the pressure drum 71 is provided with a pressure-drum motor 71*b*. The transfer motor 70*b* and the pressure-drum motor 71*b* may be controlled to be driven by the controller 50 (see FIG. 3). The transfer drum 70 and the pressure drum 71 may convey the printing medium A in the front-rear direction by rotating in opposite directions from each other.

In a printing operation in the printing apparatus 10 according to the twelfth modified example, the controller 50 may operate the transfer drum 70 and the pressure drum 71 to rotate to convey the printing medium A frontward and operate the first heads 21 and the second heads 22 to discharge the inks in the basic colors through the first nozzles 24*a* and the ink in the custom color from the second nozzles 24*b*, respectively, at the transfer drum 70. Thereby, images such as the image C and the patch chart P may be formed on the transfer drum 70. The image on the transfer drum 70 may move as the transfer drum 70 rotates and may be pressed against the printing medium A at the position between the transfer drum 70 and the pressure drum 71. Thereby, the image may be transferred from the transfer drum 70 and printed on the printing medium A.

More Examples

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, with regard to the embodiment described earlier and the first through eleventh modified examples, in place of the printing apparatus 10, a printing system having the plurality of heads 20, the platen 11, the plurality of tanks 12, the conveyer 30, the movable device 40, the display 14, the input device 15, and the controller 50 may be provided. In this arrangement, the plurality of heads 20, the platen 11, the plurality of tanks 12, the conveyer 30, and the movable device 40 may form a printer unit, and the display 14 and the input device 15 may be provided separately from the printer unit. The display 14 and the input device 15 provided separately from the printer unit may be provided to a computer. Optionally, the controller 50 may be provided to at least one of the printer unit and the computer.

For another example, with regard to the eleventh modified example, in place of the printing apparatus 10, a printing system having the plurality of heads 60, the platen 11, the plurality of tanks 12, the transfer drum 70, the pressure drum 71, the display 14, the input device 15, and the controller 50 may be provided. In this arrangement, the plurality of heads 60, the platen 11, the plurality of tanks 12, the transfer drum 70, and the pressure drum 71 may form a printer unit, and the display 14 and the input device 15 may be provided separately from the printer unit. The display 14 and the input device 15 provided separately from the printer unit may be provided to a computer. Optionally, the controller 50 may be provided to at least one of the printer unit and the computer.

For another example, with regard to the embodiment described earlier and the first through twelfth modified examples, the third tanks 12*c* continuous with the third heads 23 through the third flow path 13*c* may not necessarily contain the ink for foundation. For example, the third tanks 12*c* may contain ink to be used in a post-printing process, and the ink may be supplied from the third tanks 12*c* through the third flow paths 13*c* to the third heads 23. The ink for post-printing process may be, for example, translucent ink that may apply glossy coating on the printed image C.

For another example, with regard to the embodiment described earlier and the first through eleventh modified examples, the inks in the basic colors, the custom colors, and the foundation colors may not necessarily be supplied from the first tanks 12*a* through the first flow paths 13*a* to the first heads 21, from the second tanks 12*b* through the second flow paths 13*b* to the second heads 22, or from the third tanks 12*c* through the third flow paths 13*c* to the third heads 23, respectively. In other words, optionally, the inks in the basic colors, the inks in the custom colors, and the inks for the foundation colors may be supplied to the same heads 20. For example, the inks in the basic colors, the custom colors, and the foundation colors may be supplied to the same heads 20 from the first tanks 12*a* through the first flow paths 13*a*, from the second tanks 12*b* through the second flow paths 13*b*, and from the third tanks 12*c* through the third flow paths 13, respectively. For another example, in the arrangement that the inks in the basic colors, the custom colors, and the foundation colors are supplied to the same heads 20, the first heads 21, the second heads 22, and the third heads 23 may not necessarily be provided with the separate nozzle plates 27, but a single piece of nozzle plate 27 may be provided to the plurality of heads 20. The single piece of nozzle plate 27 may have the first nozzle lines 21*a*-21*d*, the second nozzle lines 22*a*-22*d*, and the third nozzle lines 23*a*-23*d*. Moreover, in the arrangement that the inks in the basic colors, the custom colors, and the foundation colors are supplied to the same heads 20, a number of nozzle lines in the second nozzle lines 22*a*-22*b* and/or the third nozzle lines 23*a*-23*d* may be reduced. For example, the second nozzle lines 22*b*-22*d* and the third nozzle lines 23*b*-23*d* may be omitted, and the second nozzle lines 22*a* and the third nozzle lines 23*a* alone may be provided.

For another example, in the embodiment described earlier and the first through eleventh modified examples, the inks in the basic colors, the custom colors, and the foundation colors are supplied from the first tanks 12*a* through the first flow paths 13*a* to the first heads 21, from the second tanks 12*b* through the second flow paths 13*b* to the second heads 22, and from the third tanks 12*c* through the third flow paths 13c to the third heads 23, respectively, and the first heads 21, the second heads 22, and the third heads 23 are in the so-called off-carriage style having and the first flow paths 13a, the second flow paths 13b, and the third flow paths 13c which are rubber tubes or plastic tubes. However, optionally, the first heads 21, the second heads 22, and the third heads 23 may be in a so-called on-carriage style. In other words, the carriage 41 may have the first heads 21, the second heads 22, the third heads 23, the first tanks 12a, the second tanks 12b, and the third tanks 12c mounted thereon without having the flow paths formed of rubber tubes or plastic tubes. In the on-carriage style, the first flow paths 13a, the second flow paths 13b, and the third flow paths 13c may be formed of resin rather than rubber tubes or plastic tubes. For example, the heads 20 may be formed of blocks of laminated resin plates, and the first flow paths 13a, the second flow paths 13b, and the third flow paths 13c may be formed of through-holes and/or grooves formed in the blocks of laminated plates.

For another example, with regard to the embodiment described earlier and the first through tenth modified examples, the carriage 41 may not necessarily be equipped with all of the first heads 21, the second heads 22, and the third heads 23. For example, the carriage 41 may have the first heads 21 and the second heads 22 alone and omit the third heads 23.

For another example, with regard to the embodiment described earlier and the first through tenth modified examples, the carriage 41 may not necessarily be equipped with two (2) first heads 21, two (2) second heads 22, and two (2) third heads 23. For example, the carriage 41 may have a single first head 21, a single second head 22, and a single third head 23. For another example, the carriage 41 may have three or more first heads 21, three or more second heads 22, and three or more third heads 23.

For another example, with regard to the fifth modified example, the operation of first nozzles 24a of the first heads 21 may be modified. In the fifth modified example described above (see FIG. 14), in the third pass process, for printing the rearmost row in the printing patch group P0 (D5) starting from the first one of the first patches P01, the inks in the basic colors may be discharged from the first nozzles 24a of the first head 21 on the left, which is located rearward with respect to the first head 21 on the right; meanwhile, in the first pass process, for printing the frontmost row in the first imaging patch group P1 (D5) starting from the first one of the first imaging patches P1, the inks in the basic colors may be discharged from the first nozzles 24a of the first head 21 on the right, which is located frontward with respect to the first head 21 on the left. However, the operation of first nozzles 24a of the first heads 21 may not necessarily be limited to this. For example, the inks in the basic colors may be discharged from the first nozzles 24a in the first head 21 on the left, which is located rearward with respect to the first head 21 on the right, alone. In other words, in the third pass process, for printing the rearmost row in the printing patch group P0 (D5) starting from the first one of the first patches P01, the inks in the basic colors may be discharged from rearward ones of the first nozzles 24a of the first head 21 on the left; further, in the first pass process, for printing the frontmost row in the first imaging patch group P1 (D5) starting from the first one of the first imaging patches P1, the inks in the basic colors may be discharged from the rearward ones of the first nozzles 24a of the first head 21 on the left. For another example, the inks in the basic colors may be discharged from the first nozzles 24a in the first head 21 on the right, which is located frontward with respect to the first head 21 on the left, alone. In other words, for printing the first patches P01 and the first imaging patches P1 having the same colors, the ink may be discharged from the second nozzles 24b of the second head 22 on the left alone or may be discharged from the second nozzles 24b of the second head 22 on the right alone, similarly to the inks in the basic colors.

For another example, with regard to the eighth modified example, the printed position of the first imaging patch group P1 (D5) on the second printing medium A2 may not necessarily be rearward and rightward with respect to the printed position of the printing patch group P0 (D5) on the first printing medium A1 (see FIG. 16). For example, the printed position of the first imaging patch group P1 (D5) on the second printing medium A2 may be rearward and leftward with respect to the printed position of the printing patches P0 (D5) on the first printing medium A1. For another example, the printed position of the first imaging patch group P1 (D5) on the second printing medium A2 may be frontward and rightward with respect to the printed position of the printing patches P0 (D5) on the first printing medium A1. For another example, the printed position of the first imaging patch group P1 (D5) on the second printing medium A2 may be frontward and leftward with respect to the printed position of the printing patches P0 (D5) on the first printing medium A1.

The present disclosure is applicable to a printing apparatus, by which color calibration of an image may be improved, a method for controlling the printing apparatus, and a computer-readable storage medium for the printing apparatus.

What is claimed is:

1. A printing apparatus, comprising:
    a first head including first nozzles for printing an image based on image data in inks in basic colors on a printing medium and first driving elements causing the inks to be discharged through the first nozzles;
    a second head including second nozzles for printing an image based on the image data in an ink in a custom color different from the basic colors on the printing medium and second driving elements causing the ink to be discharged through the second nozzles;
    first flow paths for supplying the inks in the basic colors to the first nozzles;
    at least one second flow path for supplying the ink in the custom color to the second nozzles, and
    a controller configured to:
        before loading the at least one second flow path with the ink in the custom color, acquire a first printing color gamut, the first printing color gamut being a gamut including the custom color within a printing color gamut in a predetermined color space, the printing color gamut being a gamut including color values of colors printable in the inks in the basic colors and the custom color, and
        after acquiring the first printing color gamut and after loading the at least one second flow path with the ink in the custom color, operate the first driving elements and the second driving elements to print patches for first imaging color values, the first imaging color values being color values falling within the first printing color gamut among color values in the image data.

2. The printing apparatus according to claim 1, wherein the controller is configured to, before loading the at least one second flow path with the ink in the custom color, acquire a second printing color gamut, the second printing color gamut being a gamut not including the custom color within the printing color gamut, and after acquiring the first printing color gamut and the second printing color gamut and after loading the at least one second flow path with the ink in the custom color, operate the first driving elements and the second driving elements to print the patches for the first imaging color values and patches for second imaging color values, the second imaging color values being color values falling within the second printing color gamut among the color values in the image data.

3. The printing apparatus according to claim 2, wherein a number of the patches to be printed per first imaging color value is greater than a number of the patches to be printed per second imaging color value.

4. The printing apparatus according to claim 1, wherein the controller is configured to, before loading the at least one second flow path with the ink in the custom color, acquire a second printing color gamut, the second printing color gamut being a gamut not including the custom color within the printing color gamut, and after acquiring the first printing color gamut and the second printing color gamut and after loading the at least one second flow path with the ink in the custom color, operate the first driving elements and the second driving elements to print the patches for the first imaging color values without printing patches for second imaging color values, the second imaging color values being color values falling within the second printing color gamut among the color values in the image data.

5. The printing apparatus according to claim 1, further comprising a conveyer configured to convey the printing medium in a first direction, wherein after acquiring the first printing color gamut and after loading the at least one second flow path with the ink in the custom color, the controller is configured to operate the first driving elements and the second driving elements to print patches for the color values falling within the printing color gamut and the patches for the first imaging color values on a single piece of the printing medium, and positions of first patches to be printed on the printing medium among the patches for the color values falling within the printing color gamut, the first patches having same color values as the patches for the first imaging color values, and positions of the patches for the first imaging color values to be printed on the printing medium are different in one of the first direction, a second direction intersecting with the first direction, and both the first direction and the second direction.

6. The printing apparatus according to claim 5, further comprising a carriage movable in the second direction along with the first nozzles and the second nozzles, wherein the controller is configured to:

repeat a pass process and a conveying process alternately, the pass process being a process to operate the first driving elements and the second driving elements to discharge the inks through the first nozzles and the second nozzles at the printing medium and operate the carriage to move along with the first nozzles and the second nozzles, the conveying process being a process to operate the conveyer to convey the printing medium, and operate the first driving elements and the second driving elements to print the first patches and the patches for the first imaging color values in different pass processes.

7. The printing apparatus according to claim 5, further comprising a carriage movable in the second direction along with the first nozzles and the second nozzles, wherein the first nozzles and the second nozzles are arrayed in lines extending in the first direction, and the controller is configured to, when operating the first driving elements and the second driving elements to print the first patches and the patches for the first imaging color values through the first nozzles and the second nozzles, use different ones of the first nozzles and different ones of the second nozzles between the first patches and the patches for the first imaging color values.

8. The printing apparatus according to claim 5, further comprising:

a carriage movable in the second direction along with the first nozzles and the second nozzles; and a position sensor configured to detect positions of the carriage in the second direction, wherein the controller is configured to operate the first driving elements to discharge the inks through the first nozzles to print the first patches while the carriage moves through a position between a first position and a second position in the second direction and the second driving elements to discharge the ink through the second nozzles to print the patches for the first imaging color values while the carriage moves through a position between a third position and a fourth position in the second direction, the first position being different from the second position, the third position, and the fourth position, the second position being different from the third position and the fourth position, the third position being different from the fourth position.

9. The printing apparatus according to claim 1, wherein the controller is configured to locate patches for the color values falling within the printing color gamut and the patches for the first printing color gamut to be printed on the printing medium at different positions determined by random numbers.

10. The printing apparatus according to claim 1, further comprising a conveyer configured to convey the printing medium in a first direction, wherein after acquiring the first printing color gamut and after loading the at least one second flow path with the ink in the custom color, the controller is configured to operate the first driving elements and the second driving elements to print patches for the color values falling within the printing color gamut on a first printing medium being a piece of the printing medium and the patches for the first imaging color values on a second printing medium being a different piece of the printing medium from the first printing medium, and positions of first patches to be printed on the first printing medium among the patches for the color values falling within the printing color gamut, the first patches having same color values as the patches for the first imaging color values, and positions of the patches for the first imaging color values to be printed on the second printing medium are different in one of the first direction, a second direction intersecting with the first direction, and both the first direction and the second direction.

11. The printing apparatus according to claim 10,
further comprising a carriage movable in the second direction along with the first nozzles and the second nozzles,
wherein the controller is configured to, when printing one of the first patches, operate the first driving elements to discharge the inks through the first nozzles without operating the second driving elements to discharge the ink for printing one of the patches for the first imaging color values and, when printing the one of the patches for the first imaging color values, operate the second driving elements to discharge the ink through the second nozzles without operating the first driving elements to discharge the inks for printing the one of the first patches.

12. The printing apparatus according to claim 10, further comprising:
a carriage movable in the second direction along with the first nozzles and the second nozzles; and
a position sensor configured to detect positions of the carriage in the second direction,
wherein the controller is configured to operate the first driving elements and the second driving elements to discharge the inks through the first nozzles and the second nozzles to print the first patches while the carriage moves through a position between a first position and a second position in the second direction and the patches for the first imaging color values while the carriage moves through a position between a third position and a fourth position in the second direction, the first position being different from the second position, third position, and the fourth position, the second position being different from the third position and the fourth position, the third position being different from the fourth position.

13. The printing apparatus according to claim 1, wherein
representing color values each representing one of divided regions in the image include the first imaging color values, and
the patches for the first imaging color values are located to be printed at positions corresponding to positions of the divided regions within the image on the printing medium different from the printing medium for printing patches for the color values falling within the printing color gamut.

14. A printing apparatus, comprising:
a head including:
first nozzles for printing an image based on image data in inks in basic colors on a printing medium;
second nozzles for printing an image based on the image data in an ink in a custom color different from the basic colors on the printing medium;
first driving element causing the inks to be discharged through the first nozzles; and
second driving element causing the ink to be discharged through the second nozzles;
first flow path tubes for supplying the inks in the basic colors to the first nozzles;
at least one second flow path tube for supplying the ink in the custom color to the second nozzles, and
a controller configured to:
before loading the at least one second flow path tube with the ink in the custom color, acquire a first printing color gamut, the first printing color gamut being a gamut including the custom color within a printing color gamut in a predetermined color space, the printing color gamut being a gamut including color values of colors printable in the inks in the basic colors and the custom color, and
after acquiring the first printing color gamut and after loading the at least one second flow path tube with the ink in the custom color, operate the first driving elements and the second driving elements to print patches for first imaging color values, the first imaging color values being color values falling within the first printing color gamut among color values in the image data.

15. A printing apparatus, comprising:
a head including:
first nozzles for printing an image based on image data in inks in basic colors on a printing medium;
second nozzles for printing an image based on the image data in an ink in a custom color different from the basic colors on the printing medium;
first driving element causing the inks to be discharged through the first nozzles;
second driving element causing the ink to be discharged through the second nozzles;
first flow path openings for supplying the inks in the basic colors to the first nozzles; and
at least one second flow path opening for supplying the ink in the custom color to the second nozzles, and
a controller configured to:
before loading the at least one second flow path opening with the ink in the custom color, acquire a first printing color gamut, the first printing color gamut being a gamut including the custom color within a printing color gamut in a predetermined color space, the printing color gamut being a gamut including color values of colors printable in the inks in the basic colors and the custom color, and
after acquiring the first printing color gamut and after loading the at least one second flow path opening with the ink in the custom color, operate the first driving elements and the second driving elements to print patches for first imaging color values, the first imaging color values being color values falling within the first printing color gamut among color values in the image data.

* * * * *